United States Patent [19]
Tanaka

[11] Patent Number: 5,839,536
[45] Date of Patent: Nov. 24, 1998

[54] MOTORCYCLE SUSPENSION SYSTEM

[75] Inventor: Toyoji Tanaka, Iwata, Japan

[73] Assignee: Yamaha Hatsudoki Kabushiki Kaisha, Iwata, Japan

[21] Appl. No.: 712,255

[22] Filed: Sep. 3, 1996

[30] Foreign Application Priority Data

Sep. 7, 1995 [JP] Japan .................................. 7-230491

[51] Int. Cl.$^6$ .................................................. B62D 61/02
[52] U.S. Cl. .............................................. 180/227; 280/284
[58] Field of Search .................................... 180/227, 219; 280/275, 283, 284, 285

[56] References Cited

U.S. PATENT DOCUMENTS

| | | | |
|---|---|---|---|
| 4,511,013 | 4/1985 | Miyakoshi et al. | 180/227 |
| 4,653,604 | 3/1987 | De Cortanze | 180/227 |
| 4,724,920 | 2/1988 | Tsuchida et al. | 180/227 |
| 4,727,951 | 3/1988 | Morioka et al. | 180/227 |
| 4,753,314 | 6/1988 | Tsukiji | 180/227 |
| 4,805,716 | 2/1989 | Tsunoda et al. | 180/227 |
| 4,805,717 | 2/1989 | Trema | 180/227 |
| 5,495,913 | 3/1996 | Salisbury | 180/227 |

*Primary Examiner*—Kevin Hurley
*Attorney, Agent, or Firm*—Knobbe, Martens, Olson & Bear LLP

[57] ABSTRACT

A rear suspension unit for cushioning the suspension travel of a trailing arm rear wheel suspension for a motorcycle. The cushioning unit is a telescopic unit that is disposed beneath the frame and extends in a generally horizontal direction. At least a portion of the system unit is mounted beneath the frame and the crankcase transmission assembly of the motorcycle, to provide a compact and yet serviceable assembly.

8 Claims, 26 Drawing Sheets

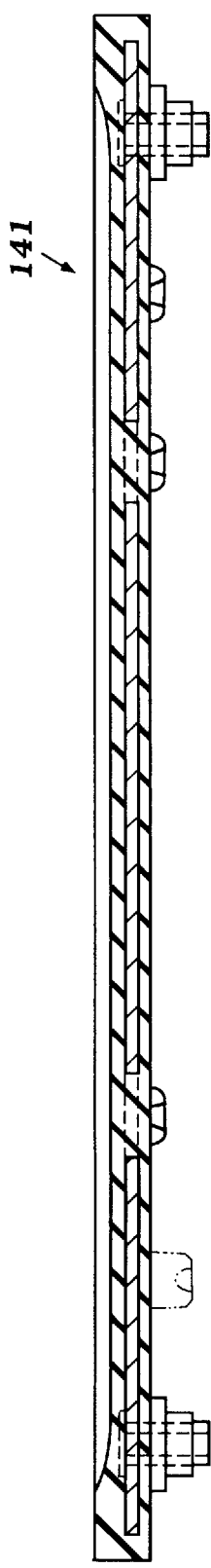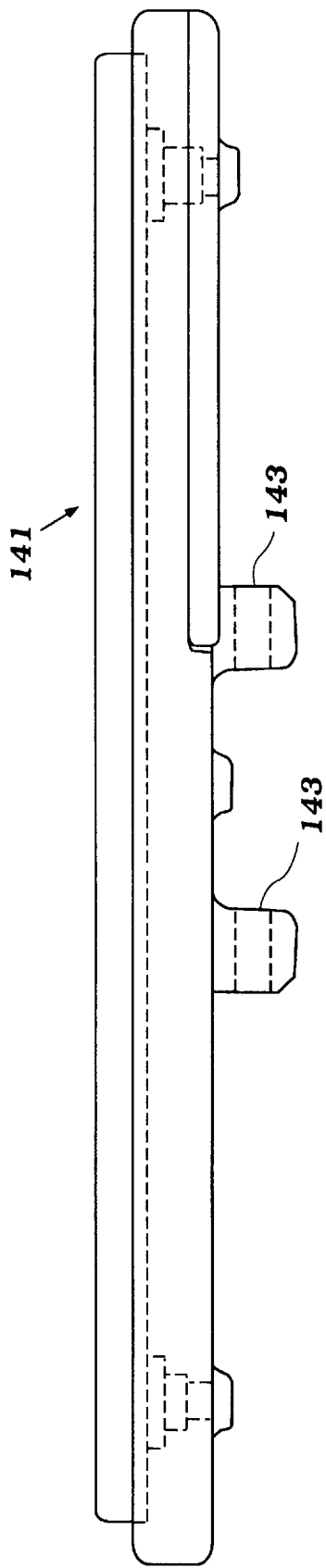

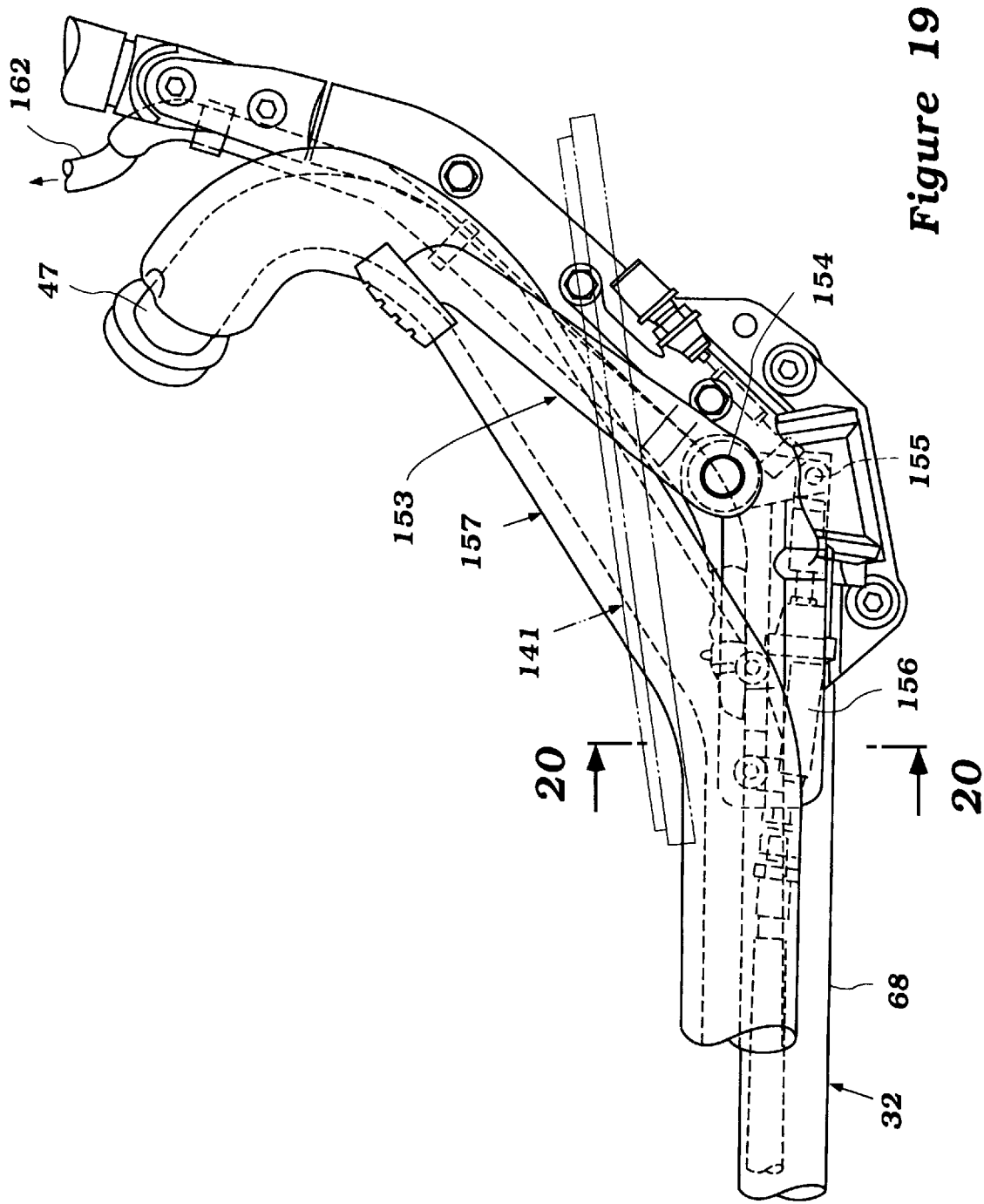

5,839,536

MOTORCYCLE SUSPENSION SYSTEM

BACKGROUND OF THE INVENTION

This invention relates to a suspension system for a motorcycle and more particularly to an improved, compact rear wheel suspension system for such vehicle.

As is well known, the design of a motorcycle presents a number of challenges for the engineer, due to its compact nature. One area that is particularly challenging is the rear wheel suspension system for such vehicles. Most modern motorcycles employ a rear wheel suspension system that permits suspension movement of the rear wheel relative to the frame. This improves not only the ride of the motorcycle, but also the handling of the bike.

In order to accommodate the transfer of drive from the engine to the rear wheel, trailing arm suspensions are commonly employed for the rear wheel of the motorcycle. The trailing arm is pivotally connected to the frame at a forward location and generally at a point forwardly of the forward peripheral edge of the rear wheel. This makes it difficult to position and load a spring and/or shock absorber assembly upon relative movement of the trailing arm relative to the frame.

Furthermore, it is desirable to provide a cushioning unit that has a relatively long stroke, and frequently the loading mechanism includes a linkage system for cooperation with the suspension assembly for varying the rate of the rear wheel suspension. By utilizing a variable rate rear wheel suspension system, it is possible to obtain large suspension travels without the likelihood of bottoming of the suspension. The variable rate system provides a relatively soft compliance under low wheel travels, with a progressively stiffening suspension as the amount of rear wheel travel increases. However, it has been increasingly difficult to provide a suspension system and method for loading the suspension element that can be compact and still accommodate the numerous other components which are required for the motorcycle and its operation.

It is, therefore, a principal object of this invention to provide an improved rear wheel suspension system for a motorcycle.

It is a further object of this invention to provide a motorcycle rear wheel suspension system that is capable of being utilized with a trailing arm rear wheel suspension.

It is a further object of this invention to provide an improved linkage arrangement for loading a suspension element of a trailing rear arm rear wheel motorcycle suspension.

It is a further object of this invention to provide a motorcycle rear wheel suspension system that permits the suspension element to be mounted at a lower portion of the frame and extend horizontally so as to accommodate large suspension travels in a relatively small area.

SUMMARY OF THE INVENTION

This invention is adapted to be embodied in a rear wheel suspension for a motorcycle having a frame assembly and a trailing arm having a forward pivotal connection to the frame assembly. A rear wheel is journaled at a rearward portion of the trailing arm for suspending the rear wheel for suspension movement relative to the frame assembly upon pivotal movement of the trailing arm. A telescopic suspension unit having a pair of relatively movable elements for controlling suspension travel of the rear wheel is provided. A bellcrank has a first pivotal connection to one of the suspension unit elements. The bellcrank has a second pivotal connection to the trailing arm which is spaced generally upwardly and rearwardly from the first pivotal connection. The bellcrank has a third pivotal connection to the frame assembly that is spaced forwardly and upwardly of the first pivotal connection for effecting pivotal movement of the bellcrank and movement of the one suspension element upon pivotal movement of the trailing arm. The other element of the suspension unit is connected to the frame assembly.

BRIEF DESCRIPTION OF THE DRAWINGS

FIG. 17 is a cross-sectional view taken through the one footrest.

FIG. 18 is a side elevational view of this one footrest.

FIG. 19 is a partial view showing the frame and brake assembly at the right-hand front side of the frame.

DETAILED DESCRIPTION OF THE PREFERRED EMBODIMENTS OF THE INVENTION

Figure 1:
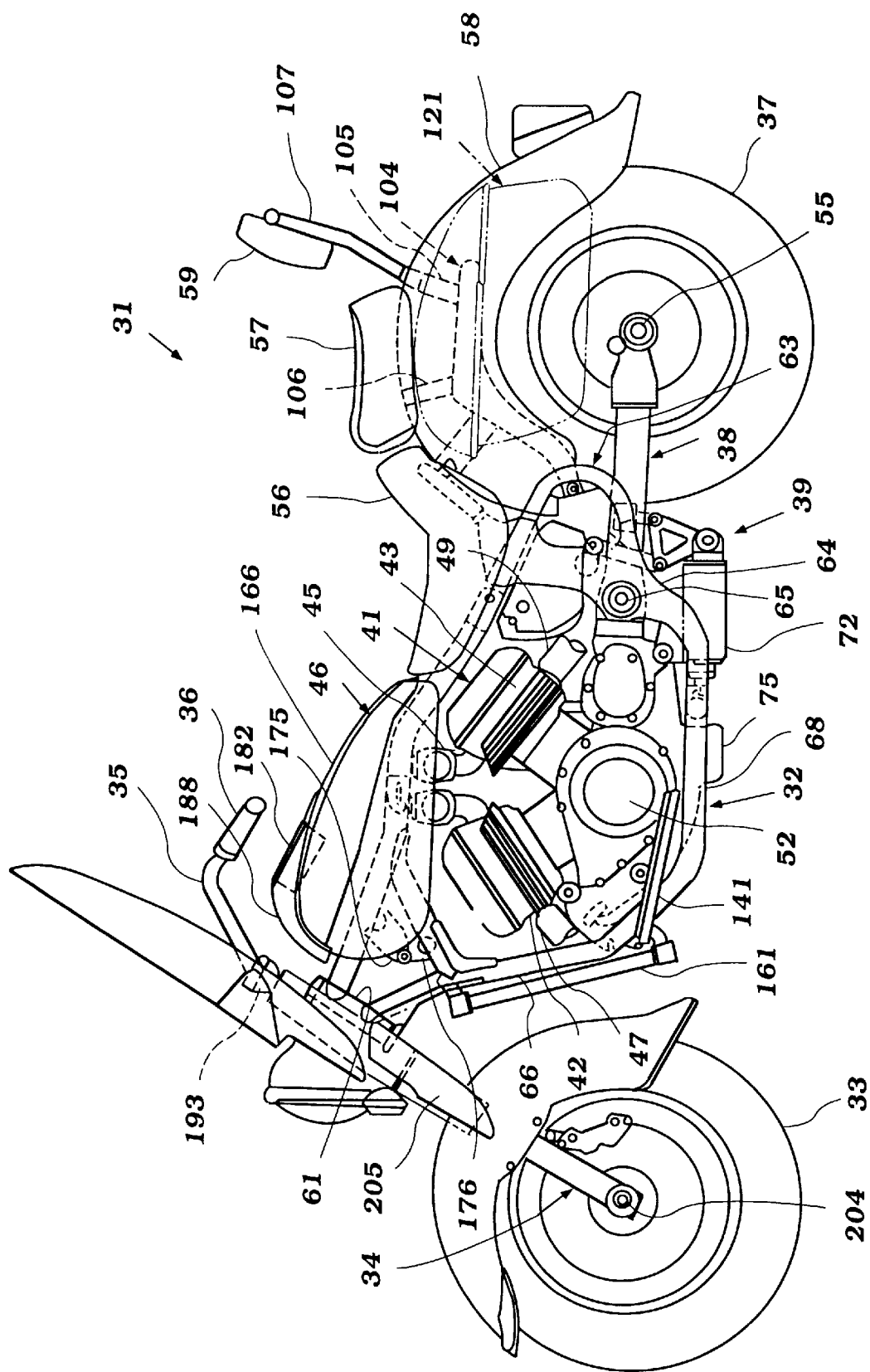
FIG. 1 is a side elevational view of a motorcycle constructed in accordance with an embodiment of the invention.

Referring now in detail to the drawings and initially to FIG. 1, a motorcycle constructed in accordance with an embodiment of the invention is identified generally by the reference numeral 31. The motorcycle 31 is comprised of a main frame assembly 32, the construction of which will be described in most detail by reference to FIGS. 2–7.

At the front of this frame assembly 32, a front wheel 33 is journaled for dirigible motion by a front fork assembly, indicated generally by the reference numeral 34, and which is steered by a handlebar assembly 35 on which handle grips 36 are positioned.

A rear wheel 37 is journaled at the rearward portion of the frame assembly 32 by means of a trailing arm assembly, indicated generally by the reference numeral 38, and a suspension unit, indicated generally by the reference numeral 39.

The rear wheel 37 is driven by an engine 41 that is mounted in the frame assembly 32 in a manner which will be generally described. In the illustrated embodiment, the engine 41 is depicted as being of the V-twin type, and thus has a forward cylinder bank 42 and a rearward cylinder bank 43. The cylinder banks 42 and 43 are disposed at any suitable V angle and contain cylinder bores in which pistons are supported for reciprocation. Although the invention is described in conjunction with a V-2, it will be readily apparent to those skilled in the art how the invention can be utilized with engines having other configurations and other cylinder numbers.

Although the internal components of the engine 41 may be of any known type, a certain general description of the engine 41 and its association with the drive for the rear wheel 37 will follow. The following description is of a general nature, for the reasons aforenoted.

An induction system, including a pair of intake manifolds 44, are positioned in the valley between the cylinder banks 42 and 43. Carburetors 45 collect air from the atmosphere through an air induction device (not shown), and form a fuel/air mixture for delivery to the intake manifolds 44. The fuel for the engine is supplied by a fuel tank assembly, indicated generally by the reference numeral 46, which is mounted in a manner to be described on the frame assembly 32, generally above the engine 41, and to the rear of the handlebar assembly 35.

The front cylinder bank 42 is provided with an exhaust manifold 47 which delivers the exhaust gases to a silencer or muffler device 48 that is disposed on one side of the motorcycle and adjacent the rear wheel 37. In a similar manner, the rear cylinder bank 43 is served by an exhaust manifold 49 that extends downwardly and rearwardly and which delivers the exhaust gases to the atmosphere through a silencer or muffler assembly 51, also positioned on one side of the rear wheel 37 and preferably, the same side as the front cylinder muffler 48.

The engine 43, as is typical with motorcycle practice, includes a crankcase and change-speed transmission assembly 52 that is driven by an engine crankshaft in a known manner and which drives an output shaft through selected speed ratios. Final drive is transferred to the rear wheel 37 in an appropriate manner, for example, by means of a shaft that passes through a tubular portion 53 of the trailing arm assembly 38, and which drives the rear wheel through a ring-and-pinion assembly contained within a final drive housing 54. This drives the rear wheel 37 through the rear axle shaft 55 in a suitable manner as is well known in this art.

A rider's seat 56 is mounted on the frame assembly 32 to the rear of the fuel tank 46 and in proximity to the handlebar assembly 35 for steering of the front wheel 33. A rider or passenger seat 57 is mounted, in a manner to be described, above a rear fender 58, which overlies the rear wheel 57. A detachable backrest 59, constructed in a manner which will also be described later, may be positioned in a mounting bracket assembly, as will be described, for affording a backrest for the rider.

Figure 2:
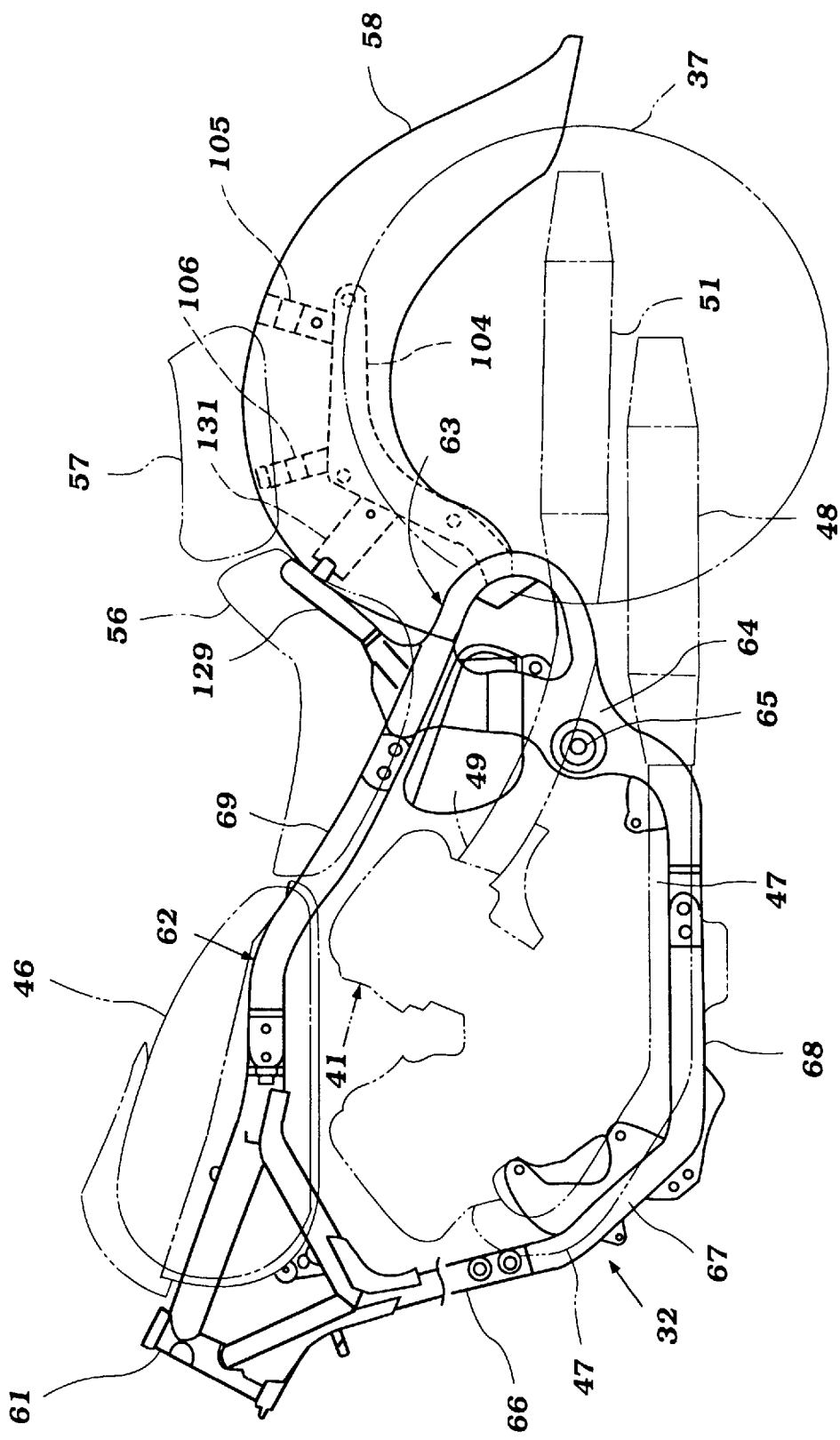
FIG. 2 is a side elevational view looking in the same direction as FIG. 1, but on a larger scale, and showing the frame assembly in solid lines, the front wheel suspension removed, and the remaining components of the motorcycle in phantom.
Figure 3:
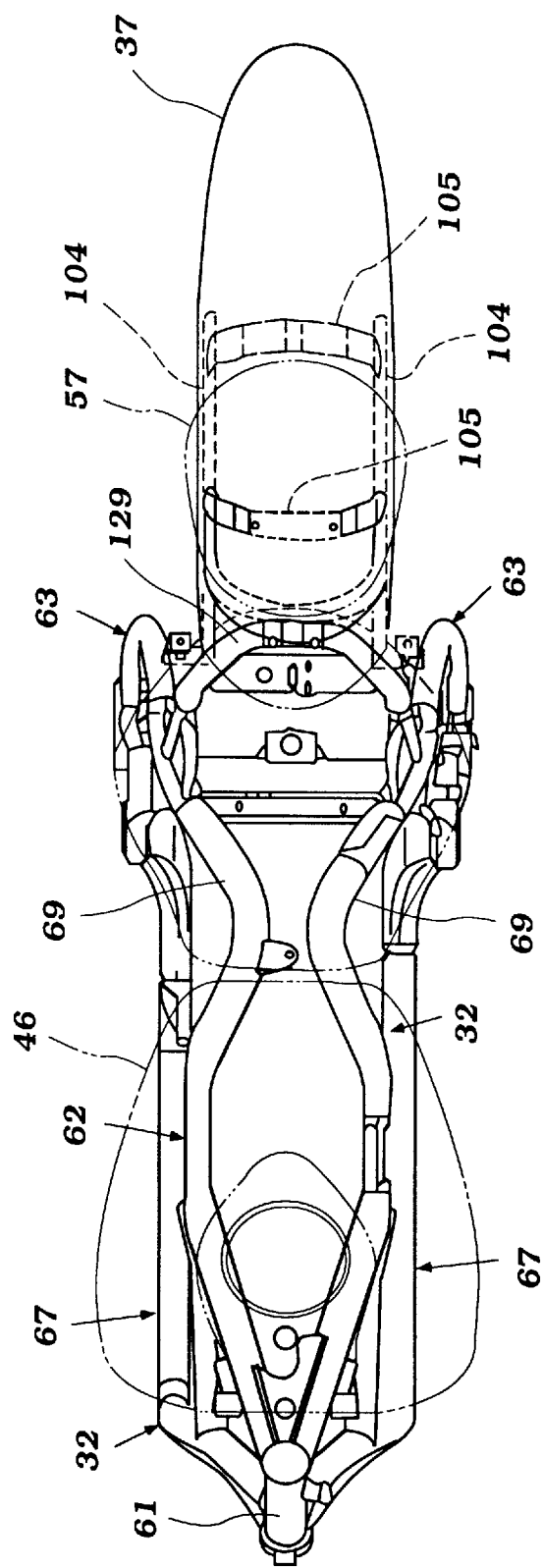
FIG. 3 is a top plan view of the assembly shown in FIG. 2, illustrating the same components in the same fashion.
Figure 4:
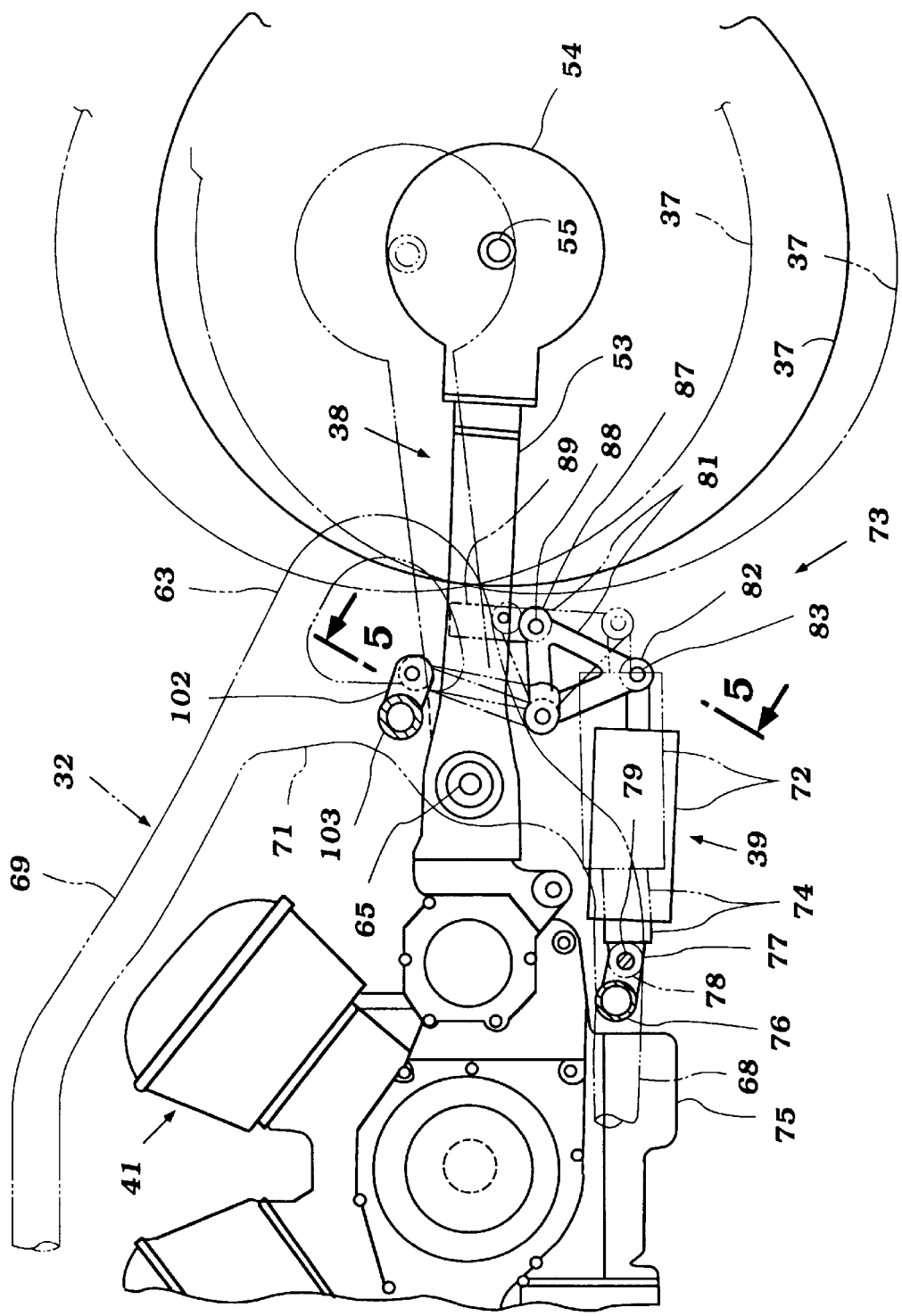
FIG. 4 is a side elevational view showing the rear wheel suspension, with the drive for the rear wheel in solid lines and the remaining components at the rear of the motorcycle, either in phantom or eliminated to more clearly show the suspension travel. This figure also shows the position of the rear wheel at normal ride height in solid lines, at full rebound in phantom lines, and in full jounce, also in phantom lines.
Figure 5:
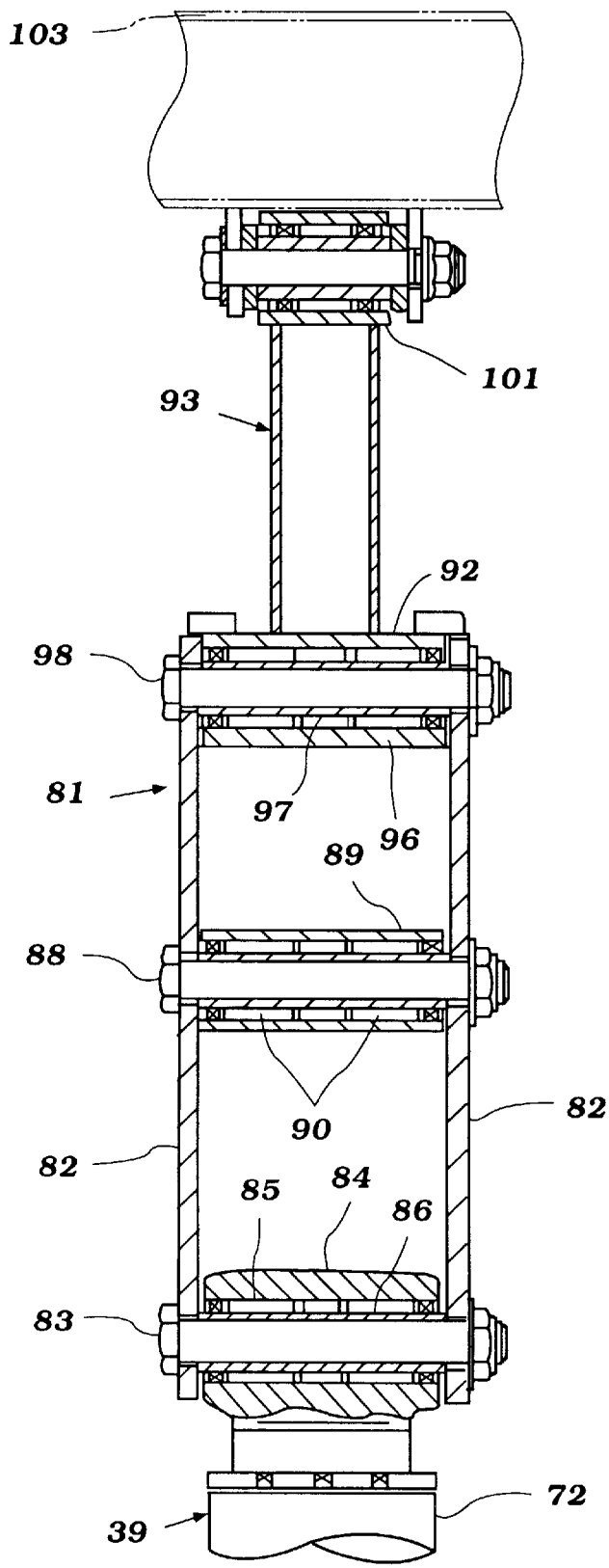
FIG. 5 is an enlarged cross-sectional view taken along the line 5—5 of FIG. 4, and constitutes a developed view showing the linkage system interposed between the frame and one of the suspension unit elements.

The frame assembly 32 will now be described by primary reference to FIGS. 2–4, although certain components of the frame assembly obviously appear in other figures. The frame assembly 32 is comprised of a head pipe 61 on which the front fork 34 is dirigibly supported, in a manner which will be described. A pair of main frame tubes 62 extends rearwardly and generally downwardly from the head pipe 61, and merge at their rear ends into a weldment assemblies 63. These weldment assemblies have central portions 64 that provides a pivot axis 65 for the trailing arm 38 for the rear wheel 37. This pivotal connection will be described in some more detail later.

Continuing on to describe the frame assembly, a pair of down tubes 66 extend downwardly and rearwardly from the head pipe 61. These down tubes 66 are connected to further extension portions 67, which curve and extend rearwardly at the lower perimeter of the frame 32 along parallel sides of the motorcycle to form horizontally extending sections 68. The rear ends of these sections 68 are connected to the rear wheel supporting assemblies 63.

As may be seen in top plan view, the main frame tubes 62 have portions 69 that are formed in the vicinity of the seat 56 so as to provide foot space for the rider so that the rider can assume a comfortable riding position. The horizontal portions 68 of the down tubes, however, extend more widely outwardly so as to afford foot areas on which the rider may place his feet, or upon the footrests which will be described in more detail later.

In addition to those frame tubes described, additional frame tubes may be employed so as to provide a rigid assembly and to accommodate certain other components of the motorcycle, as will be described.

The trailing arm assembly 38 may be of any known construction, but includes, as aforenoted, the tubular member 53 that passes the driveshaft for driving the rear wheel 37. This trailing arm assembly 38 provides a pair of side portions that are pivotally connected to the frame bracket assemblies 63 adjacent a reinforcing portion 71 formed thereof, which provides the pivotal support 65. Preferably, the drive for driving the rear wheel includes a universal joint contained within the tubular member 53, and which has one of its axes coincident with the axis defined by the pivot points 65 so as to permit free pivotal movement and up-and-down suspension movement of the rear wheel 37, as seen in the phantom line views of FIG. 4.

The suspension element for suspending this travel is comprised of a tubular telescopic type shock absorber having an outer cylinder element 72 which is loaded by a linkage system 73, constructed and arranged in accordance with an important feature of the invention. This cylinder element 72 defines a cylinder bore in which a piston is mounted. A piston rod 74 is connected to this piston and extends forwardly, and thus forms another element of the suspension unit 39. Also, a coil spring assembly may surround the suspension unit 39 and form a portion of it. This is not illustrated, but may be of any type known in the art.

The suspension unit 39 is constructed so as to be of the pull type, so that when the rear wheel 37 moves upwardly, the cylinder 72 will move axially away from the piston and piston rod 74 so as to extend the length of the unit. The way this is loaded will be described shortly. It should be noted that the suspension unit 39 extends in a generally horizontal direction between and protected by the frame tube portion 68. The suspension unit 39 is also positioned to the rear of the outer housing 75, or at least the lowermost portion thereof of the combined crankcase change-speed transmission assembly 52 of the engine 41. Hence, this suspension unit 39 is mounted in a well-protected area, and yet is mounted so that it can enjoy a relatively large stroke.

A cross-tube 76 is affixed relative to the frame tubes 68 and extends transversely across the width of the motorcycle. A link 77 is journaled on this cross-tube 76 and embraces a trunion 78 of the piston rod 74 therebetween. A pivot pin 79 couples the link 77 to the trunion 78 so as to provide a pivotal connection therebetween that accommodates the suspension travel of the suspension unit 39, as will be described.

It should be noted that the internal construction of the suspension unit 39 has not been described nor illustrated in any detail. Those skilled in the art can readily understand how the invention can be utilized with any of a wide variety of types of known tubular shock absorber and spring assemblies.

The linkage assembly which loads the other of the suspension and, namely, the cylinder assembly 72, will now be described by primary reference to FIGS. 3 and 4. This assembly includes a bellcrank, indicated generally by the reference numeral 81, and which bellcrank has a closed triangular configuration to add to its strength. A first lower leg portion 82 of this bellcrank carries a pivot pin 83 to provide a pivotal connection to an extension 84 of the cylinder element 72. A needle-type bearing 85 and sleeve 86 can be employed for reducing the friction and stress in the area of the pivotal connection 83. Also, as may be seen from FIG. 3, the bellcrank assembly 81 actually constitutes a pair of members, each disposed on a respective side of the suspension unit 39.

The bellcrank 81 has an upwardly and rearwardly extending portion that forms a further pivotal connection joint 87 that receives a pivot pin 88 so as to provide a pivotal connection to a bracket assembly 89 carried by the trailing arm 38, and preferably by a reinforcing cross-member thereof The final pivotal joint 92 of the bellcrank assembly 81 is loaded relative to the frame assembly through the use of a link 93. The link 93 has a tubular construction, as best shown in FIG. 3, and is connected to the bellcrank portion 92 via a further bearing assembly 96 and bushing 97. A pivot pin 98 completes this pivotal connection.

The upper end of the link 93 is connected by means of a bushing assembly 101 to a lever arm 102 that is pivotally supported on a cross-tube 103 that extends between the reinforcing member 71 of the assemblies 63. Thus, when the wheel travels upwardly and downwardly, the bellcrank 81 will transmit the movement to the shock absorber or suspension element unit 72 so as to effect suspension travel thereof and the desired degree of damping. The linkage assembly 73 may be configured so as to provide any desired rate change during the suspension travel.

The construction and support for the rear passenger seat 57 will now be described by primary reference to FIGS. 1–3 and 7–11. It will be seen that a pair of supporting brackets, indicated generally by the reference numeral 104, are affixed to the rear portion of the frame assembly in proximity to the main frame member 63. These supporting brackets 104 extend rearwardly and upwardly, and are disposed primarily inside of the rear fender 58. A pair of rear seat support brackets 105 and 106 extend transversely across and above the rear wheel 37 and within the interior of the fender 58.

The rear seat 57 is supported on the forwardmost of these brackets 106. The rearward bracket 105 has receptacles to receive a pair of side posts 107 of the backrest 59 so as to detachably accommodate the backrest 59 when desired.

Figure 10:
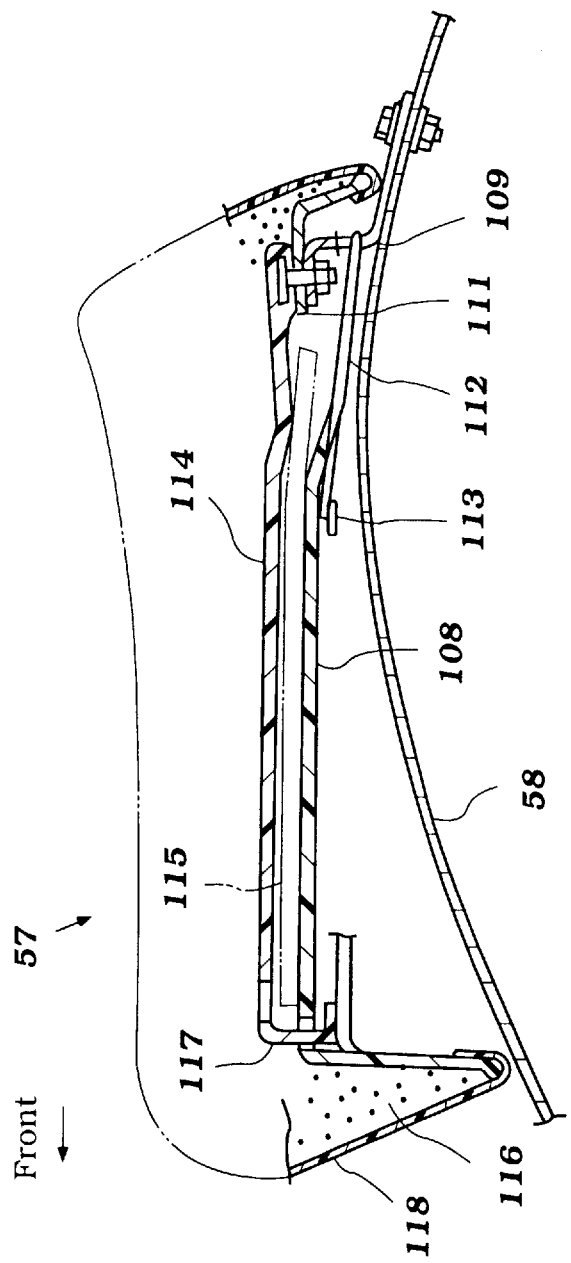
FIG. 10 is a cross-sectional view taken through the rear seat, and showing a portion of the rear fender.
Figure 11:
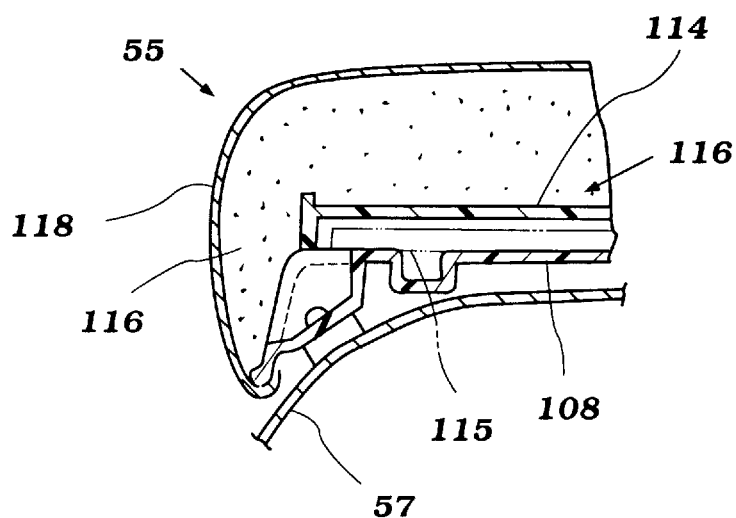
FIG. 11 is a cross-sectional view taken along a plane perpendicular to the plane of FIG. 10, and shows a portion of the side of the seat.

As may be best seen in FIGS. 10 and 11, the rear seat 57 is formed with a base or underframe 108 that provides a detachable connection by means of a support bracket 109 and connective members 111, 112 and 113 so that the rear seat can be swung or pivoted up. This underframe 108 cooperates with a lower seat support 114 to form a pocket in which such things as an owner's manual 115 may be contained. A foam padding 116 is laid over an upper surface 117 of the member 114. This is covered by a skin 118 of a suitable material so as to provide the desired degree of cushioning.

Figure 12:
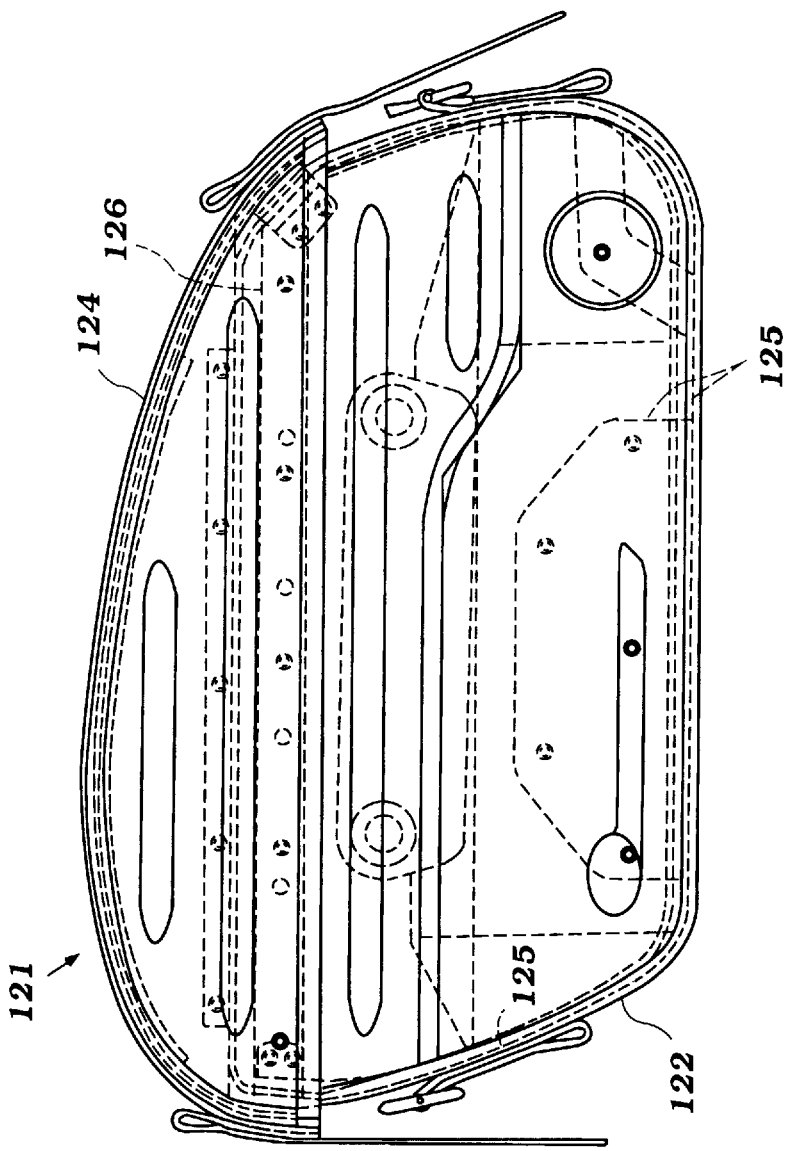
FIG. 12 is a side elevational view of one of the saddlebags.
Figure 13:
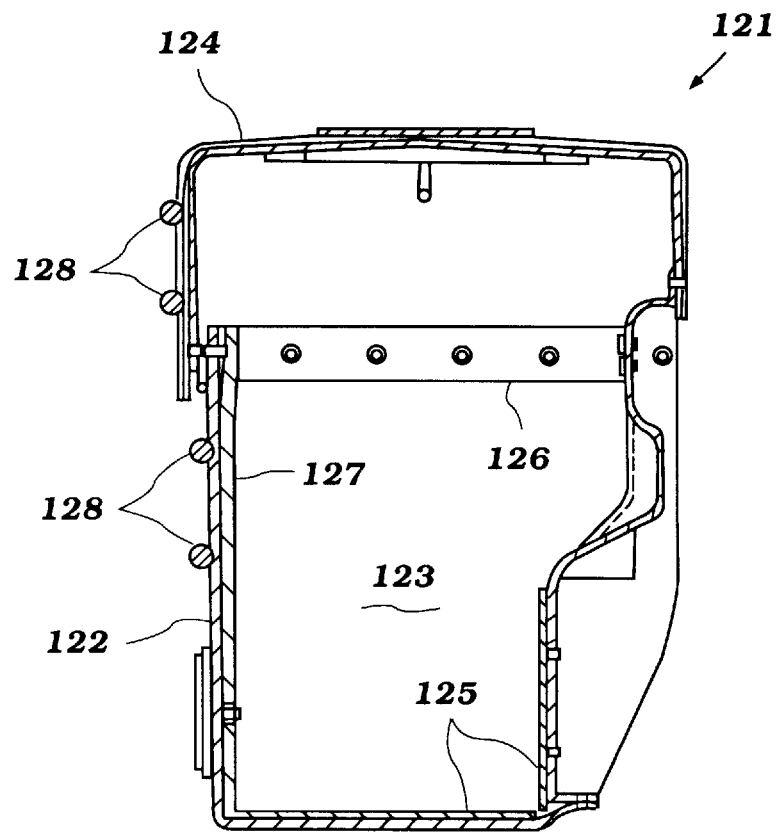
FIG. 13 is a cross-sectional taken through the saddlebag.
Figure 14:
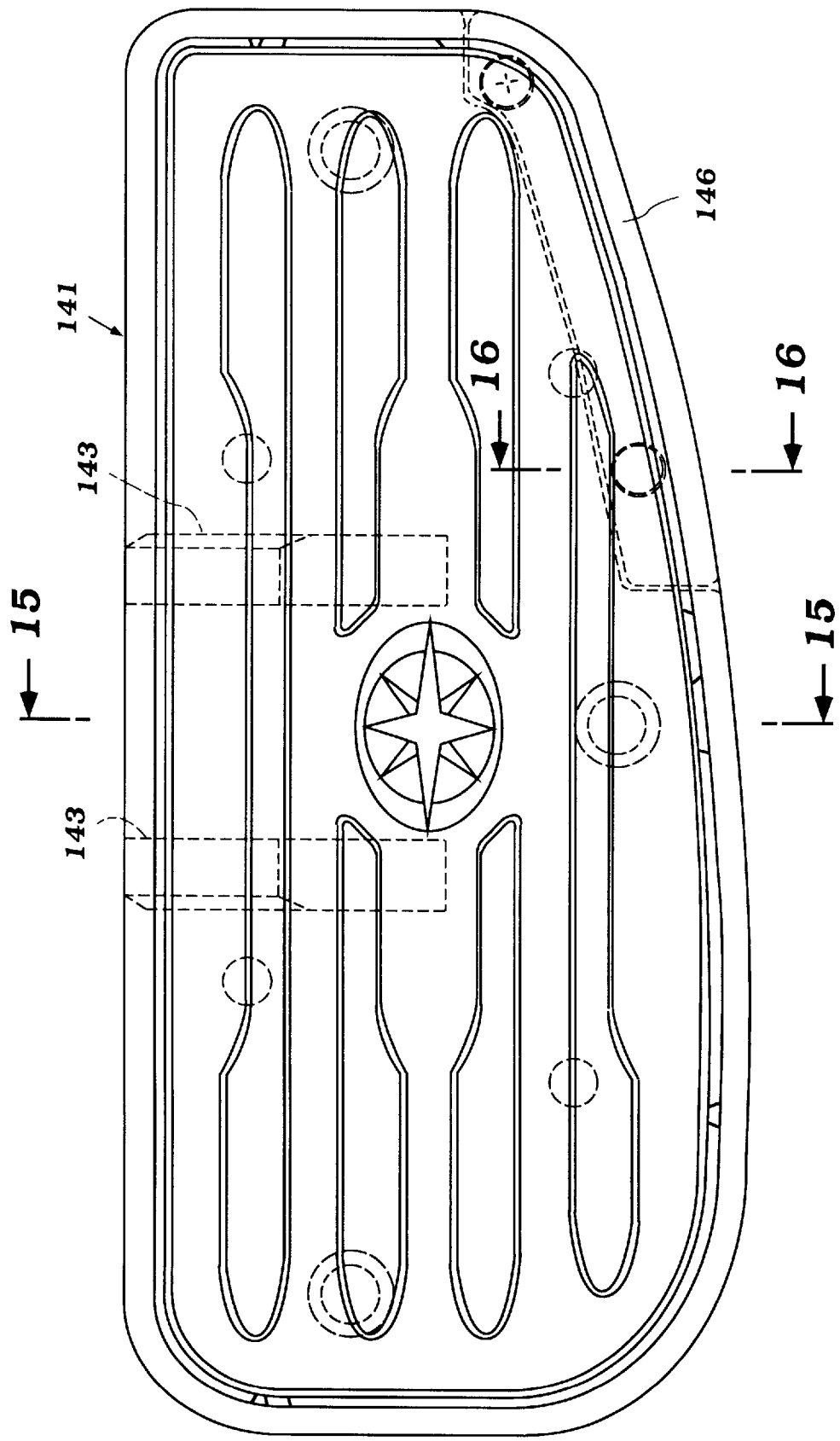
FIG. 14 is an enlarged top plan view of one of the rider footrests.
Figure 15:
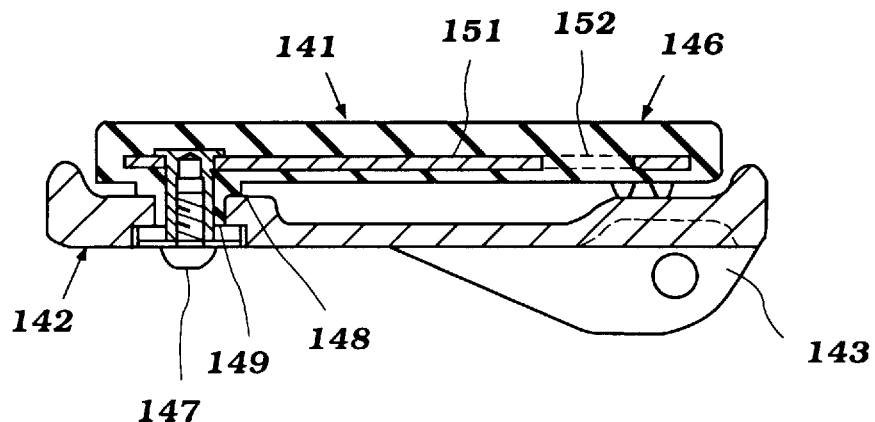
FIG. 15 is a cross-sectional view taken along the line 15—15 of FIG. 14.

Provision is made for carrying a pair of saddlebags on the opposite sides of the rear fender 58. These saddlebags are shown in phantom in FIG. 1, and are identified by the reference numeral 121. Their construction will be described in more detail now, by particular reference to FIGS. 12 and 13, where the saddlebags 121 are shown, respectively, in side elevation and in cross-section. Each saddlebag is comprised principally of a lower container portion 122 that defines an inner cavity 123, and a cover portion 124, which closes this cavity 123. The material from which the saddlebags 121 are formed may be a relatively rigid plastic or the like, and various metal reinforcing members, such as angular plates 125, and an upper peripheral framing portion 126, may be affixed to or embedded in the body material 127 of the saddlebag. A series of reinforcing bars 128 and which serve the combined purpose of improving the appearance and also providing a handle so that the cover 124 may be opened to access each of the saddlebags.

Dealing now with the area forward of the saddlebags 121, and adjacent and below the rider's seat 56, it will be noted that the frame assembly 62 is provided with a rear seat support member 129 which extends across the rearward portion of the part 69 of the main frame tube 62, and which supports the rear portion of the seat 56. A further cross-brace 131 (FIG. 2) may extend between the members 104 and this cross-brace 131, to further rigidify the structure.

Figure 6:
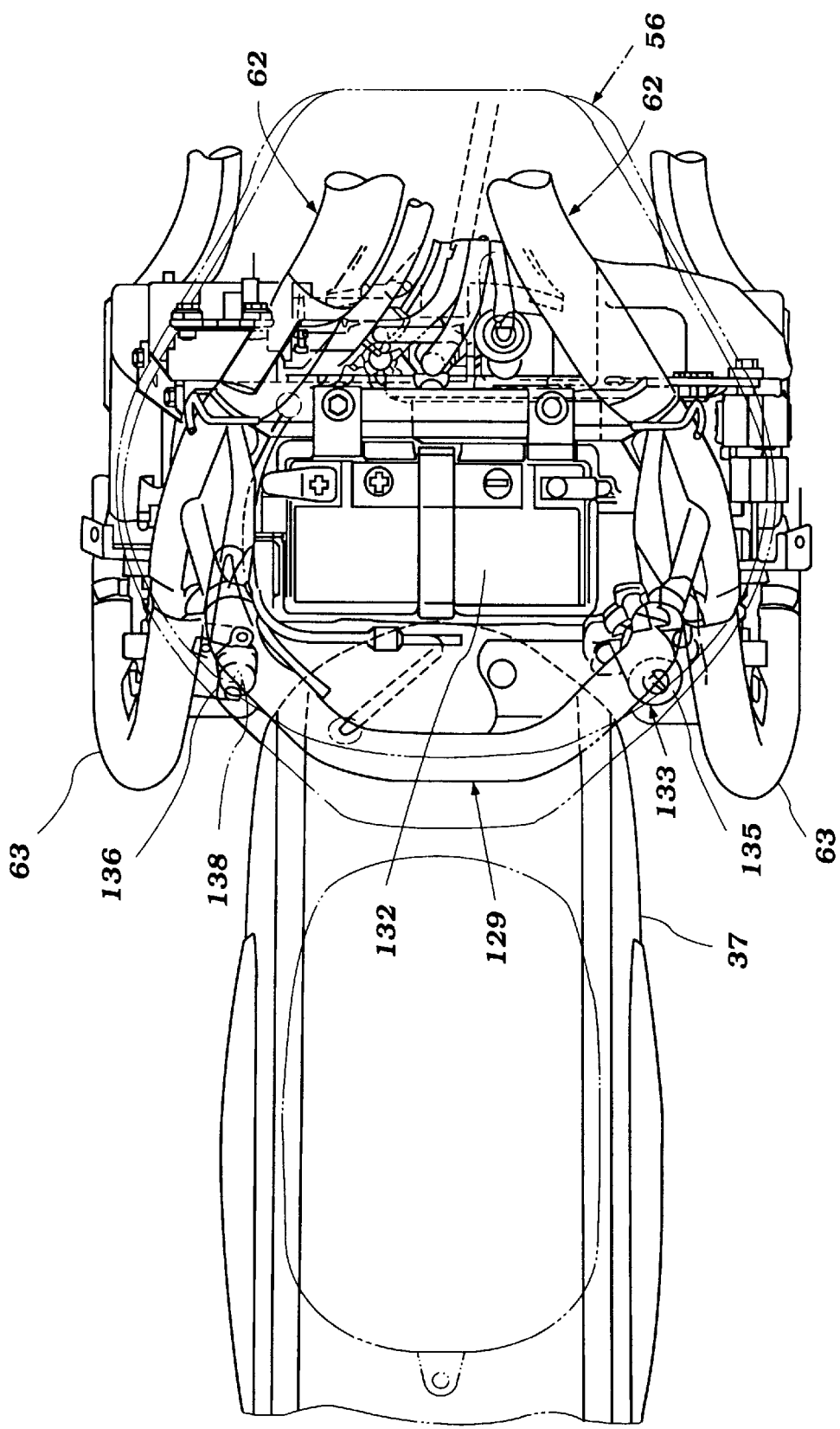
FIG. 6 is a view of the frame assembly and rear wheel, looking from above, and with the rear wheel and fender being shown in phantom and the seat removed, in order to show certain of the components.
Figure 7:
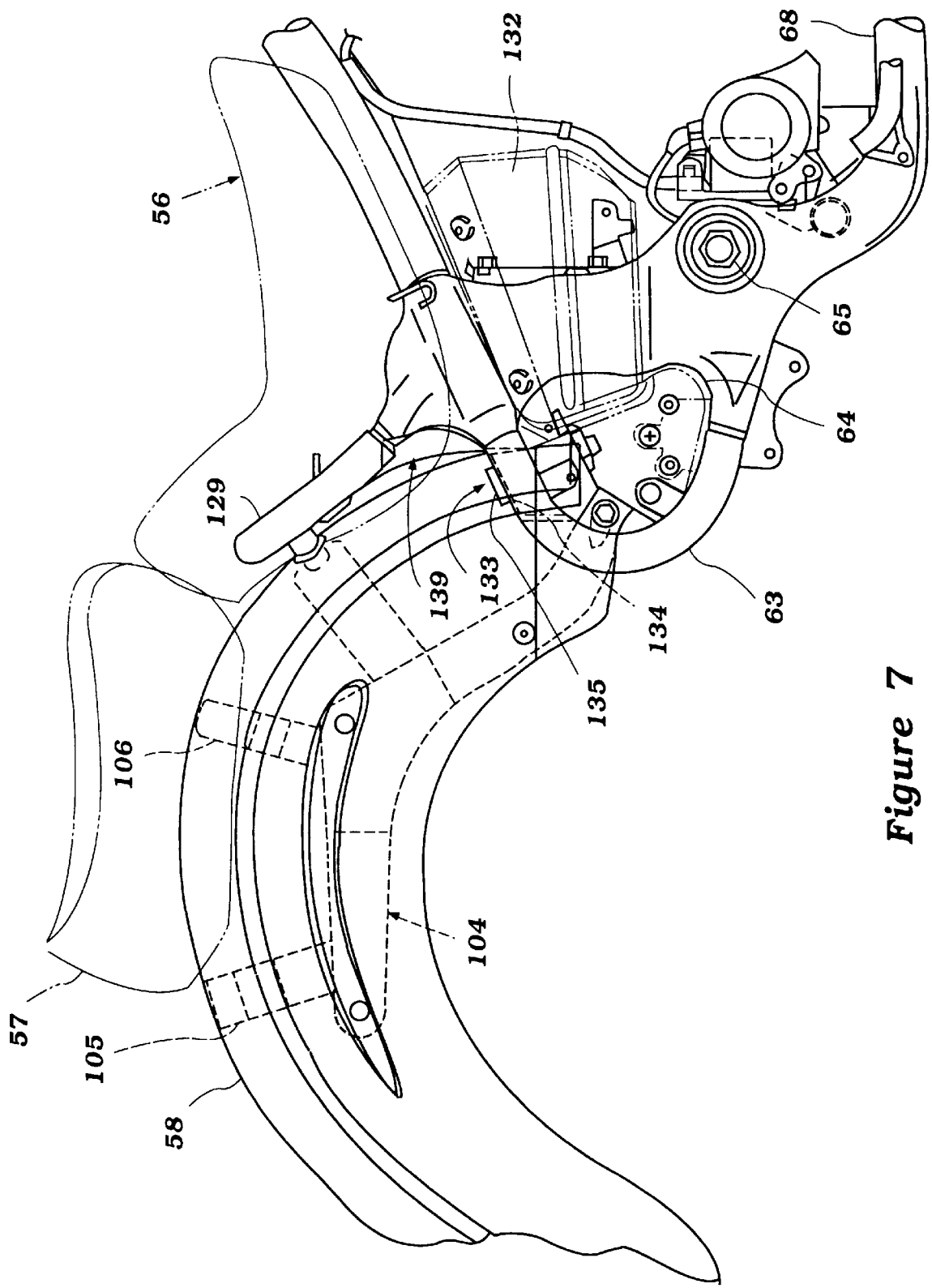
FIG. 7 is a side elevational view of the rear wheel area, looking in the direction opposite to the previous side elevational views, with the rear wheel and rear wheel suspension eliminated so as to show more clearly certain other components of the motorcycle. In this figure, some of the components, namely, the seat and seat support, are shown in phantom.
Figure 8:
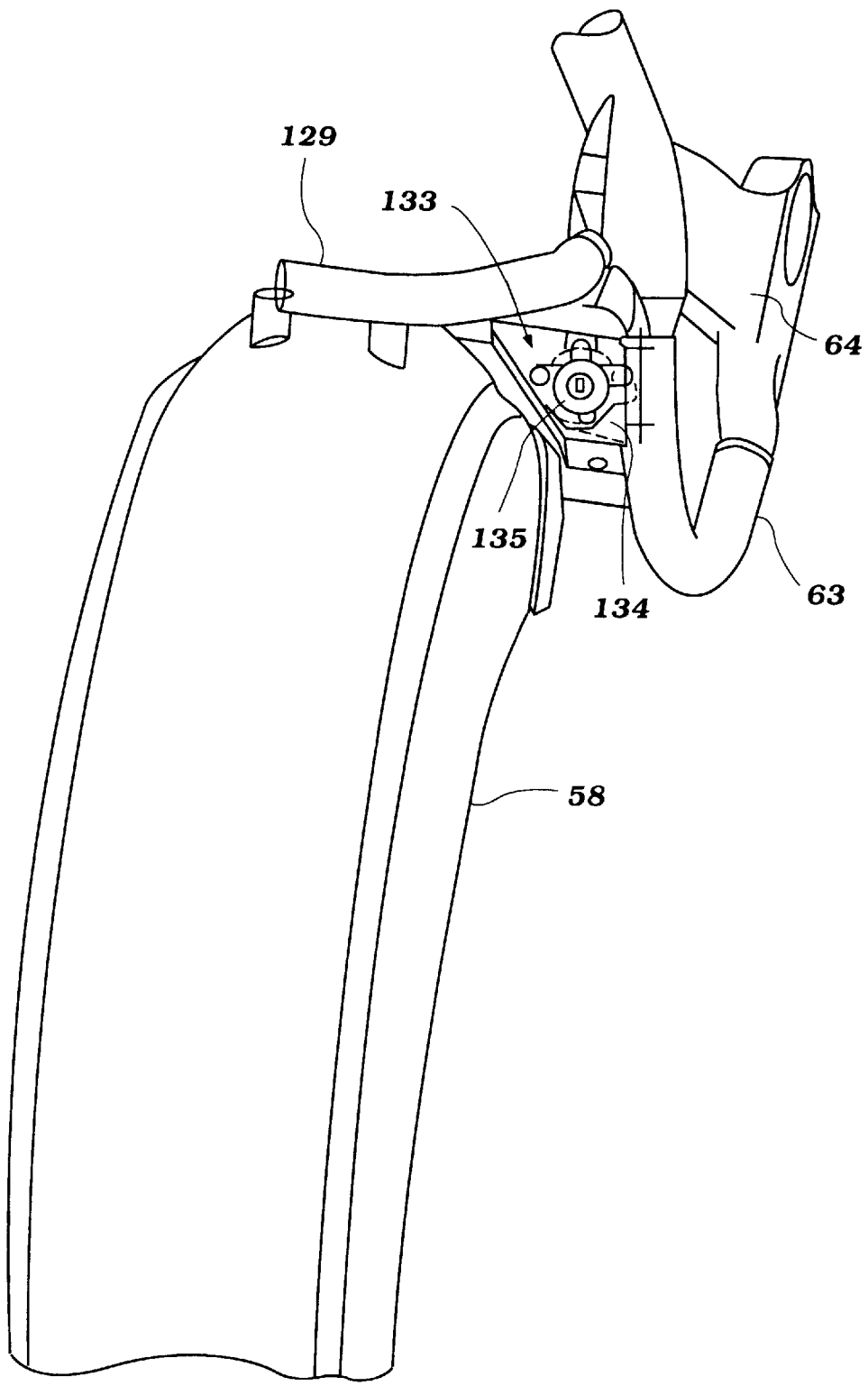
FIG. 8 is a partially perspective view of the structure shown in FIG. 7, looking
from the rear and right side thereof.
Figure 9:
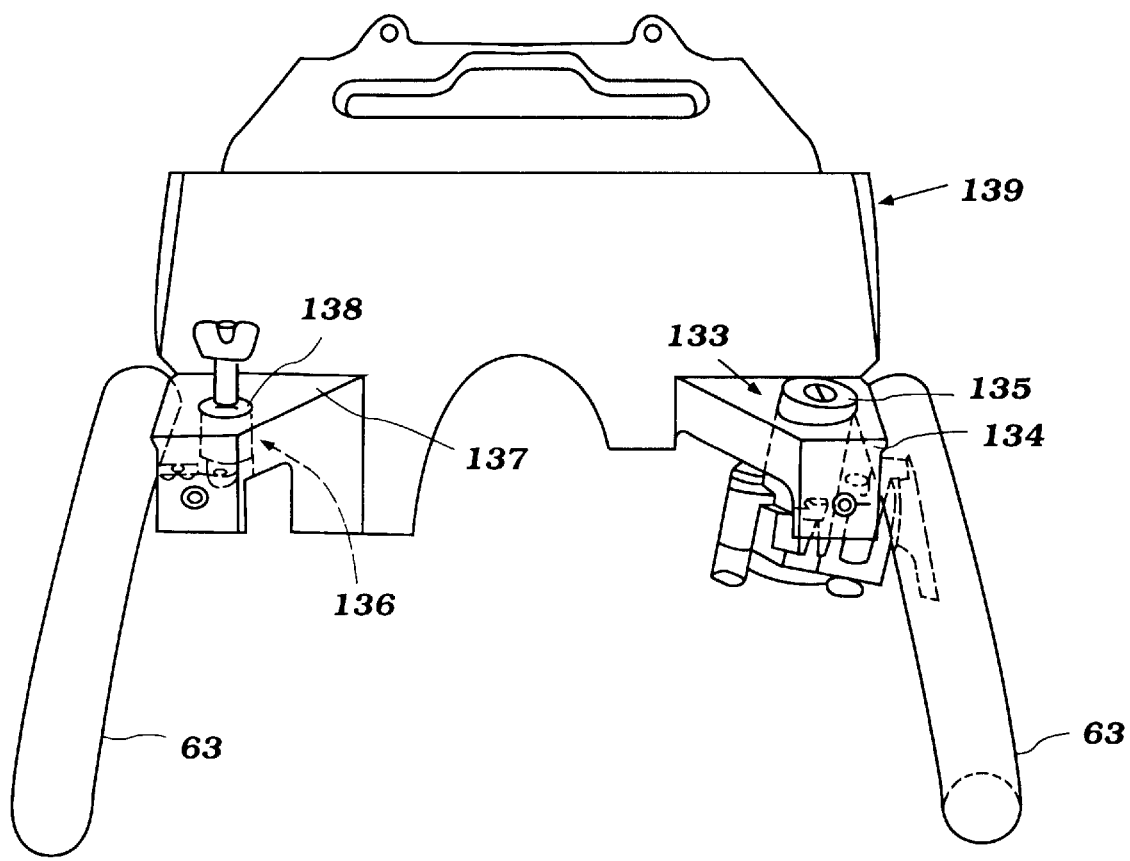
FIG. 9 is a rear elevational view showing the components associated with holding the seat in place and the main switch.

Concealed within but readily accessible beneath this area to the rear of the main seat 56, and as best shown in FIG. 6, is a battery box 132 in which the battery for the motorcycle 31 may be contained. On one side of the rear seat 56 and beneath it is a key operated main switch, indicated generally by the reference numeral 133, and which appears best in FIGS. 8 and 9. This main switch 131 includes a mounting bracket assembly 134 on which the tumbler and key-receiving portion 135 of the main switch is positioned.

On the other side of the seat 56 there is provided a latch mechanism, indicated generally by the reference numeral 136, that includes a mounting bracket 137 and a fastener assembly 138 for detachably connecting the rear portion of the seat 56 to the motorcycle frame assembly, and specifically the rear seat mounting plate 139.

Figure 16:
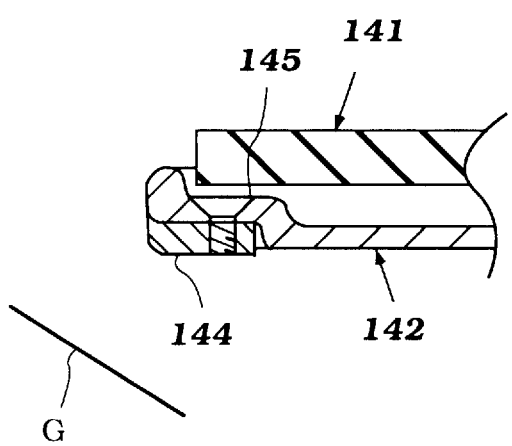
FIG. 16 is a partial cross-sectional view taken along the line 16—16 of FIG. 14, and shows the ground level when the motorcycle is leaned to the left side.

At the forward portion of the motorcycle and on opposite sides of the lower portion 68 of the down tube 36, there are provided a pair of footrests, indicated generally by the reference numeral 141. These footrests appear in FIG. 1, but are shown in most detail in FIGS. 14–18, wherein they will be described. Each footrest 141 is comprised of a lower tray portion 142 that is carried on a pair of mounting brackets 143 which may be formed integrally with it, and which afford a detachable connection to the frame, and specifically the down tube 66. The outer side of this lower tray 142 is provided with a pair of skid plates 144 detachable held in place by fasteners 145, and which will contact the ground G (see FIG. 16) on excess leaning so as to avoid wear of the actual seal portion.

The lower portion 142 has a generally trough shape, and receives a foot plate 146 that is held in place by a plurality of fasteners 147 that are threaded into tapped retainers 148 embedded in bosses 149 of the foot plate 146. A rigidifying base plate 151 having openings 152 is provided in the center of the foot plates 141 to add rigidity to the structure while at the same time maintaining a relatively low weight.

Figure 20:
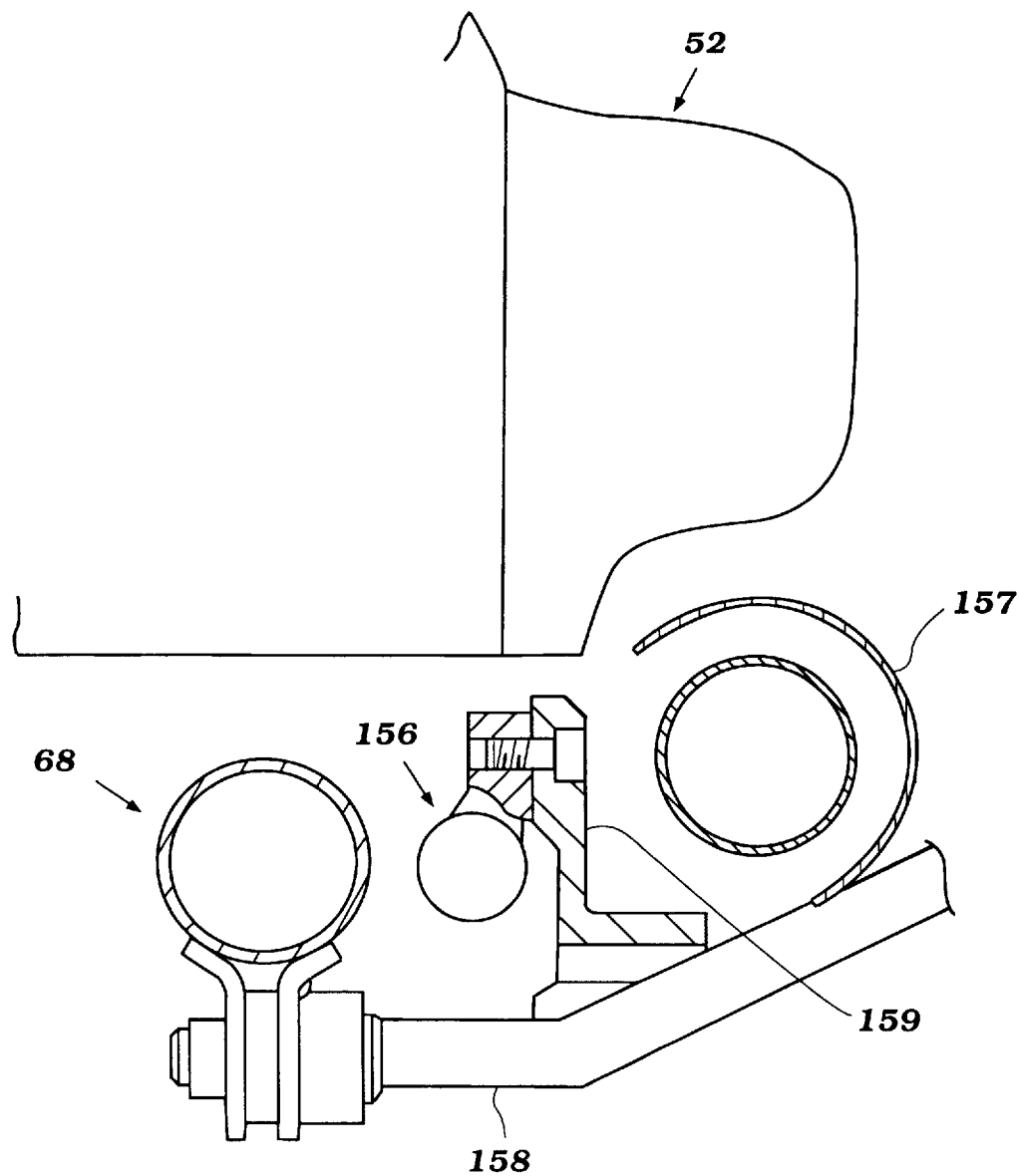
FIG. 20 is a cross-sectional view taken along the line 20—20 of FIG. 19.

Adjacent one side of the foot plates 141, and specifically on the right-hand side, is an actuating mechanism for actuating the wheel brakes, or at least one of the wheel brakes, for the motorcycle 31. This construction appears best in FIGS. 19 and 20, wherein a brake pedal lever 153 is illustrated as being pivotally mounted on a bracket 154. This brake pedal lever 153 operates through a linkage system 155 to actuate a master cylinder 156 that is mounted on the frame in this area, and specifically, on an outrigger through which the exhaust manifold 47 extends, and which exhaust manifold is protected by a heat shield 157, so that the operator's feet will be protected. The master cylinder 156 is mounted on the outrigger 158 by means of a supporting bracket 159. This structure is carried by the lower portion 68 of one of the down tubes and extends below a portion of the crankcase transmission assembly 52 of the engine.

As may be seen in FIG. 1, the engine 41 may be totally or partially water-cooled. A heat exchanger 159 is mounted at the front of the frame, in a suitable manner, and water is circulated through it through conduits, such as the conduit 161 that appears in FIG. 19.

Figure 21:
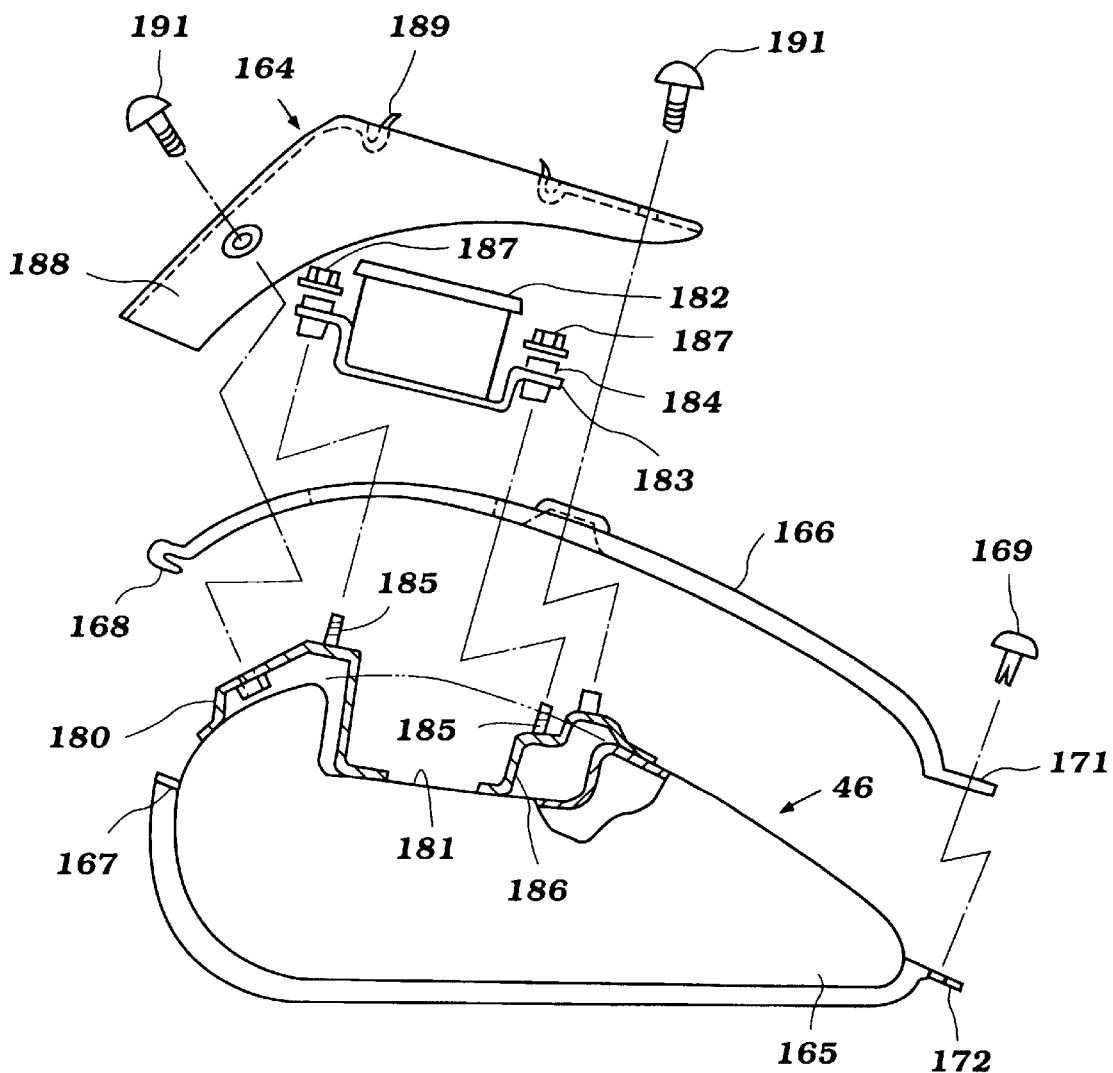
FIG. 21 is a partially exploded side elevational view showing the relationship of the fuel tank and instrument panel, with portions broken away and shown in section.
Figure 22:
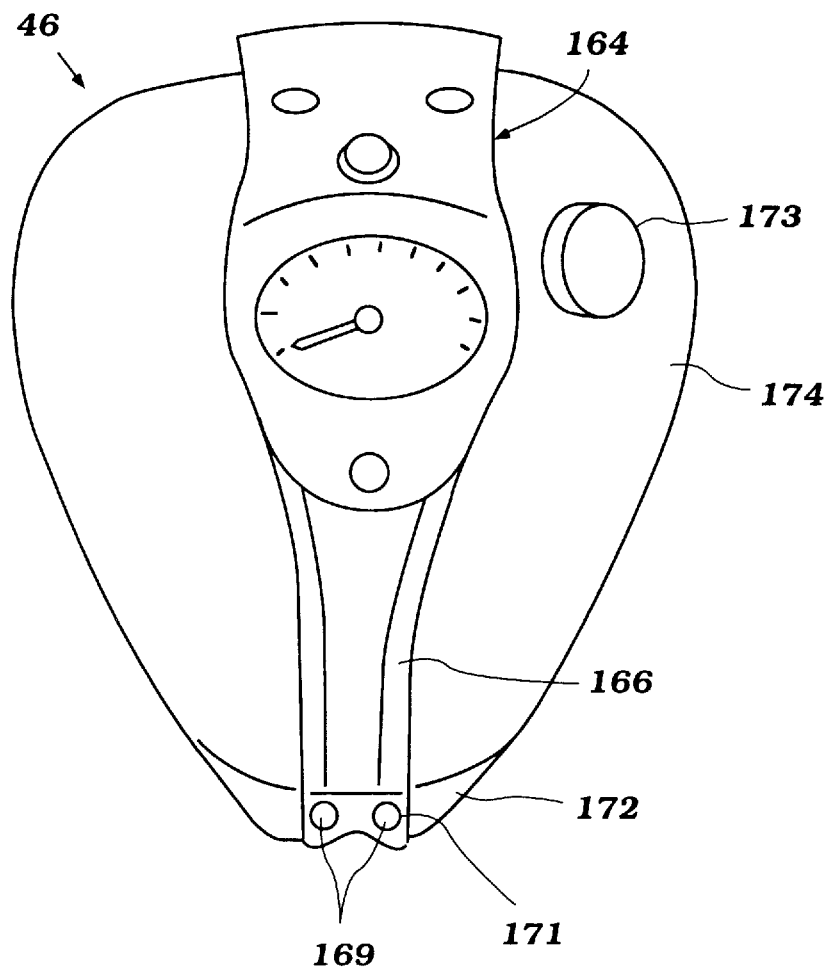
FIG. 22 is a top plan view of the instrument panel and fuel tank.
Figure 23:
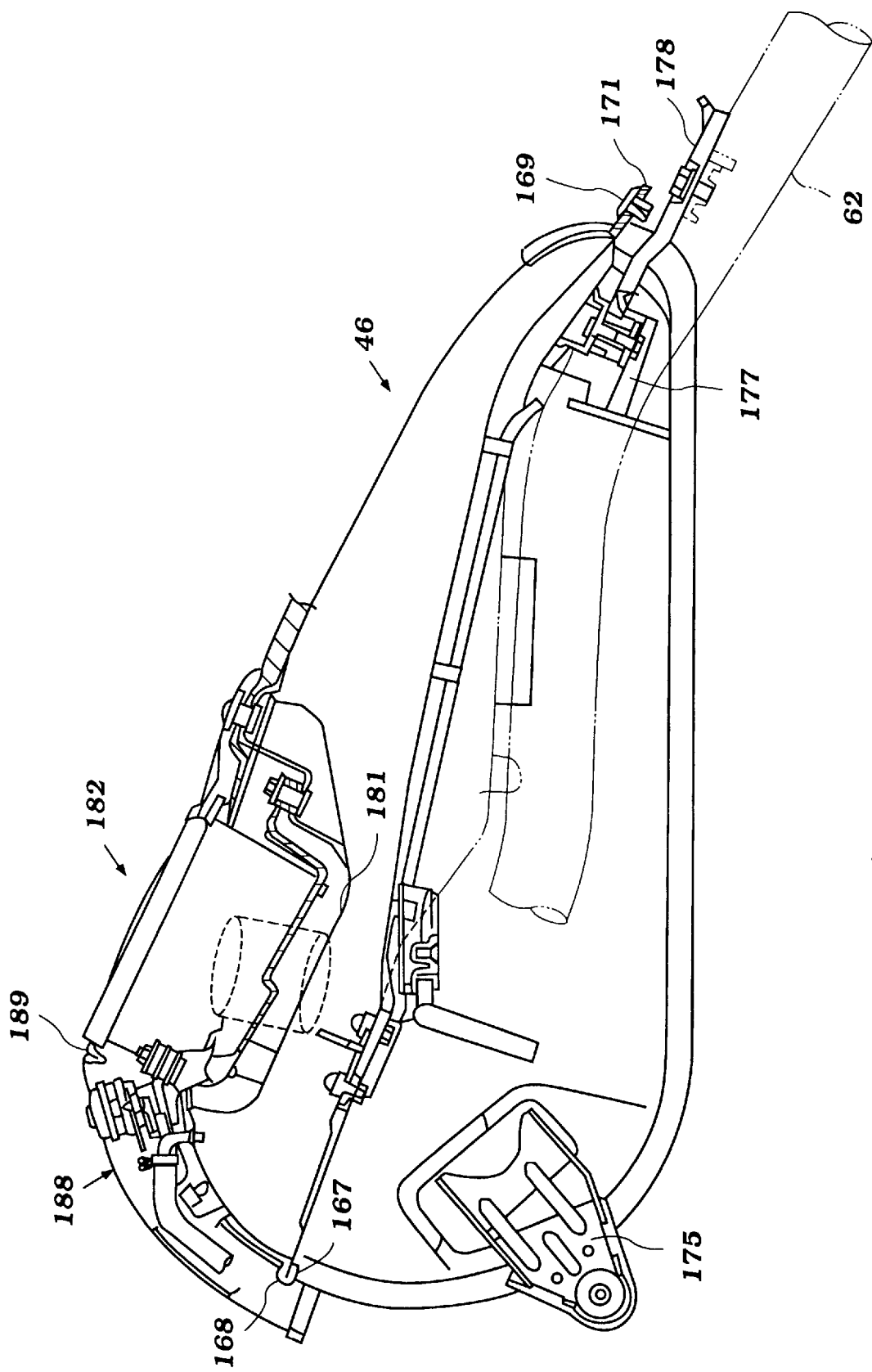
FIG. 23 is a side elevational view looking generally in the same direction as FIG. 21, and shows how the fuel tank is mounted to the frame and how the instrument panel is mounted to the fuel tank.

It has been noted that the fuel tank 46 is mounted on the frame assembly 32 forwardly of the seat 56. The mounting of the fuel tank 46 and an associated instrument cluster, indicated generally by the reference numeral 164, will now be described by particular reference to FIGS. 21–23. It will be seen that the fuel tank 46 includes a main shell portion 165 that is carried within a cradle comprised of a lower member 165 and an upper member 166. The members 165 and 166 have interfitting forward edges 167 and 168 that provide a connection therebetween so as to embrace the fuel tank 46 therein. A threaded fastener 169 extends through a flange 171 at the rearward end of the member 166 and into a tapped opening in a flange 172 of the lower member 165 so as to complete this connection. The cradle members 166 and 167 are spaced so that they leave a ready access to the fill cap 173 formed in an upper surface 174 of the fuel tank 146.

The fuel tank 146 has a pair of brackets 175 fixed to its lower forward ends and which brackets are connected to a mounting plate 176 carried by the frame assembly, as seen in FIG. 1. Rear brackets 177 are affixed to a mounting bracket 178 carried by the main frame tubes 62 so as to complete the mounting of the fuel tank on the frame.

The fuel tank 46, and specifically its upper surface 174, is provided with a central depression or well 181 into which an instrument body 182 may be received. The instrument body 182 is carried on a mounting plate 183 which, in turn, receives flexible grommets 184. These grommets 184 are received on threaded posts 185 that re affixed to a mounting bracket assembly 186, which is welded to the fuel tank within the recess 181 Threaded fasteners 187 cooperate with the grommets 184 and posts 185 to hold the instrument body in place.

Finally, a trim piece 188, which has an opening 189 complementary to the instrument 182, is fixed to the fuel tank mounting brackets 186 by means of threaded fasteners 191, so as to provide a neat appearance.

Figure 24:
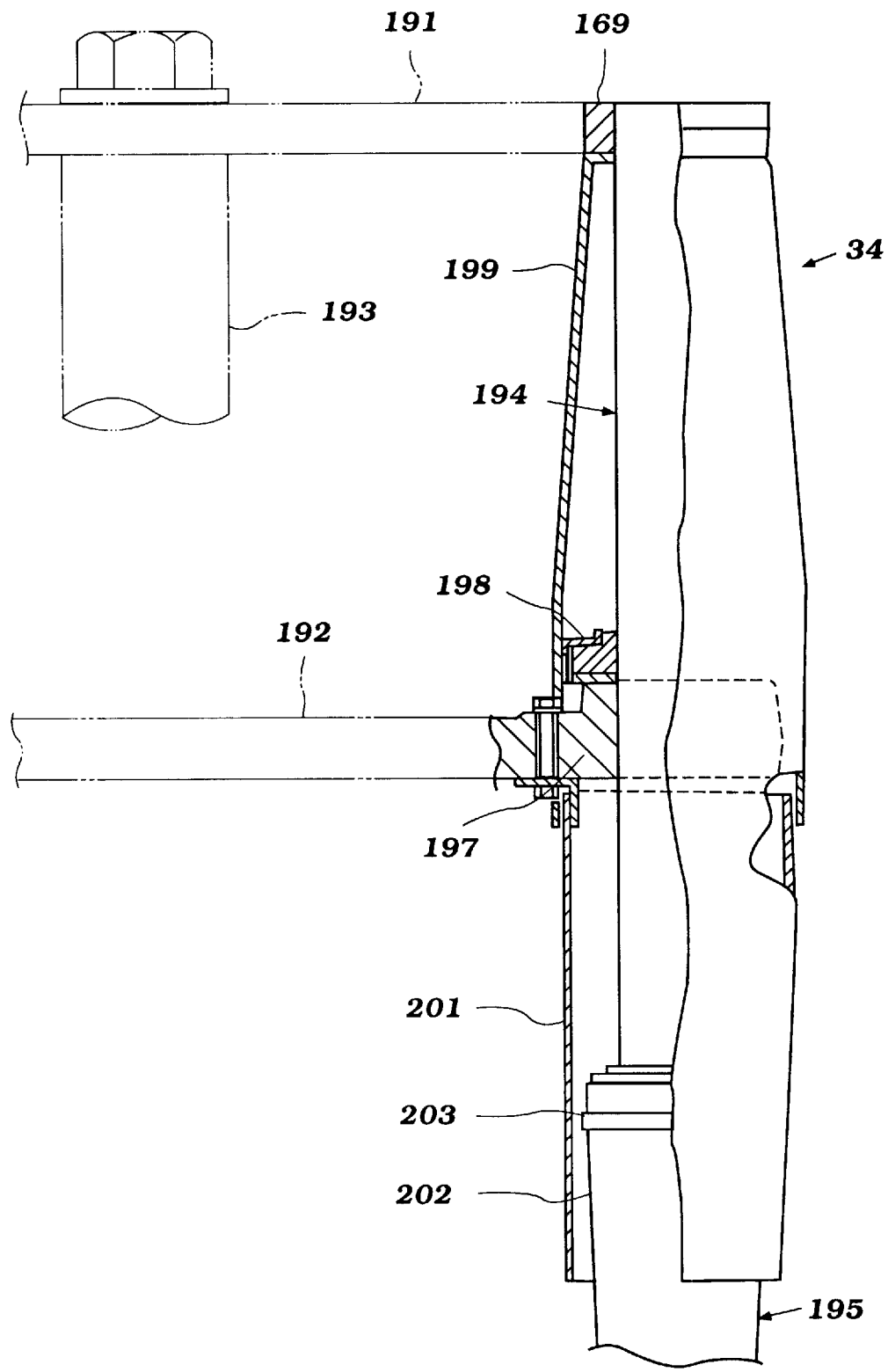
FIG. 24 is a view showing one of the front wheel suspension elements, with portions broken away and shown in phantom, and showing its relationship to the front fork in phantom.

The front fork assembly 34 and its association with the head pipe 61 will now be described by reference primarily to FIGS. 24–26. The front fork assembly 34 is comprised of a pair of upper and lower cross-tubes or brackets 191 and 192 that are affixed to the upper and lower ends of a steering shaft 193. This steering shaft 193 is journaled by the head pipe 61 and is connected to the handlebar assembly 35.

A piston member 194 of a strut assembly, indicated generally by the reference numeral 195, is affixed to these brackets by upper and lower connectors 196 and 197. A seal 198 encircles the upper bracket 197. This connection is contained within an upper tube 199 at a lower tube 201, which tubes encircle the strut 195 and protect it.

The strut further includes a cylinder 202 and upper seal assembly 203 for hydraulically damping the movement of the front wheel 33. The front wheel 33 has an axle 204 that is rotatably journaled at the ends of the cylinders 202 so as to provide hydraulic damping for the movement of the front wheel 33. In addition, a suitable spring arrangement may also be contained in this area.

Figure 25:
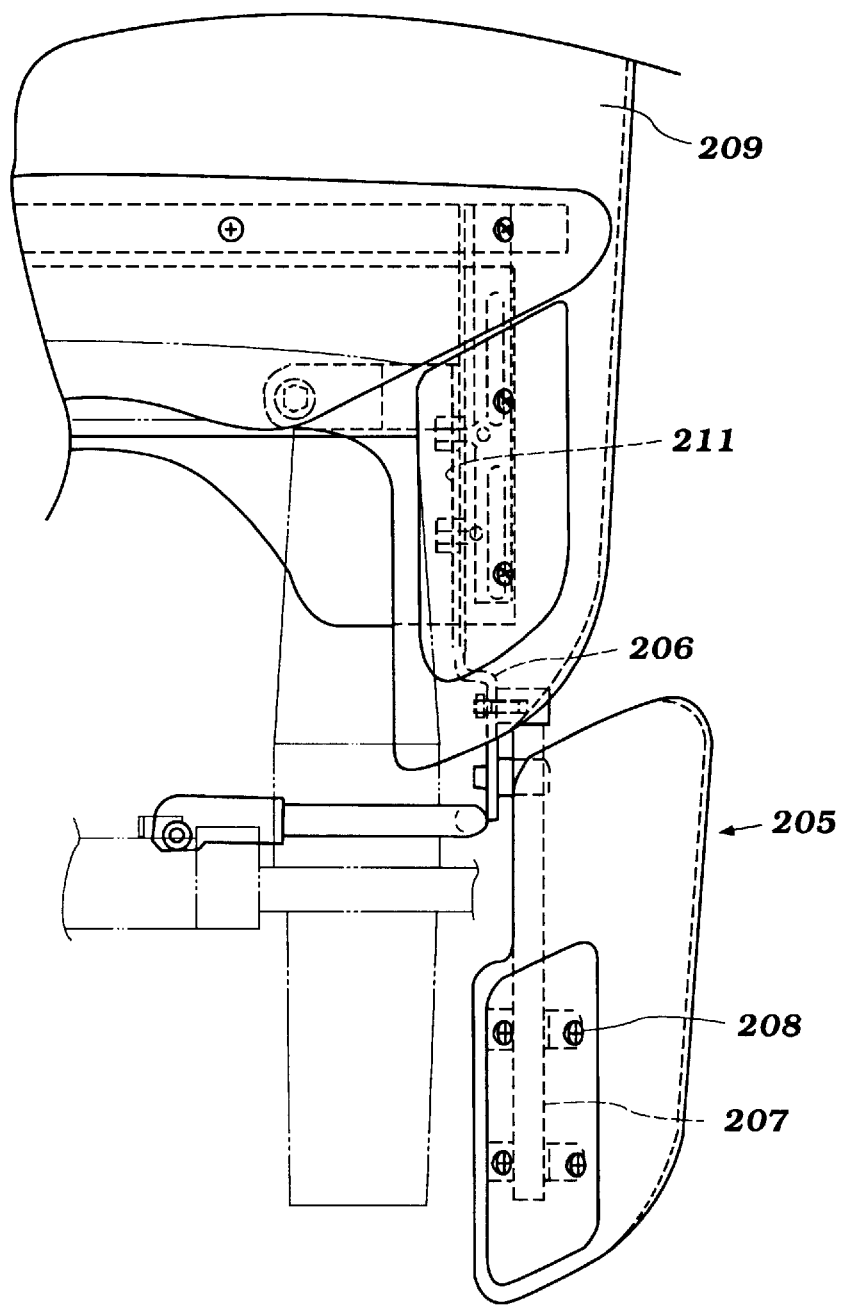
FIG. 25 is a front elevational view showing the same side of the motorcycle, but on a smaller scale.
Figure 26:
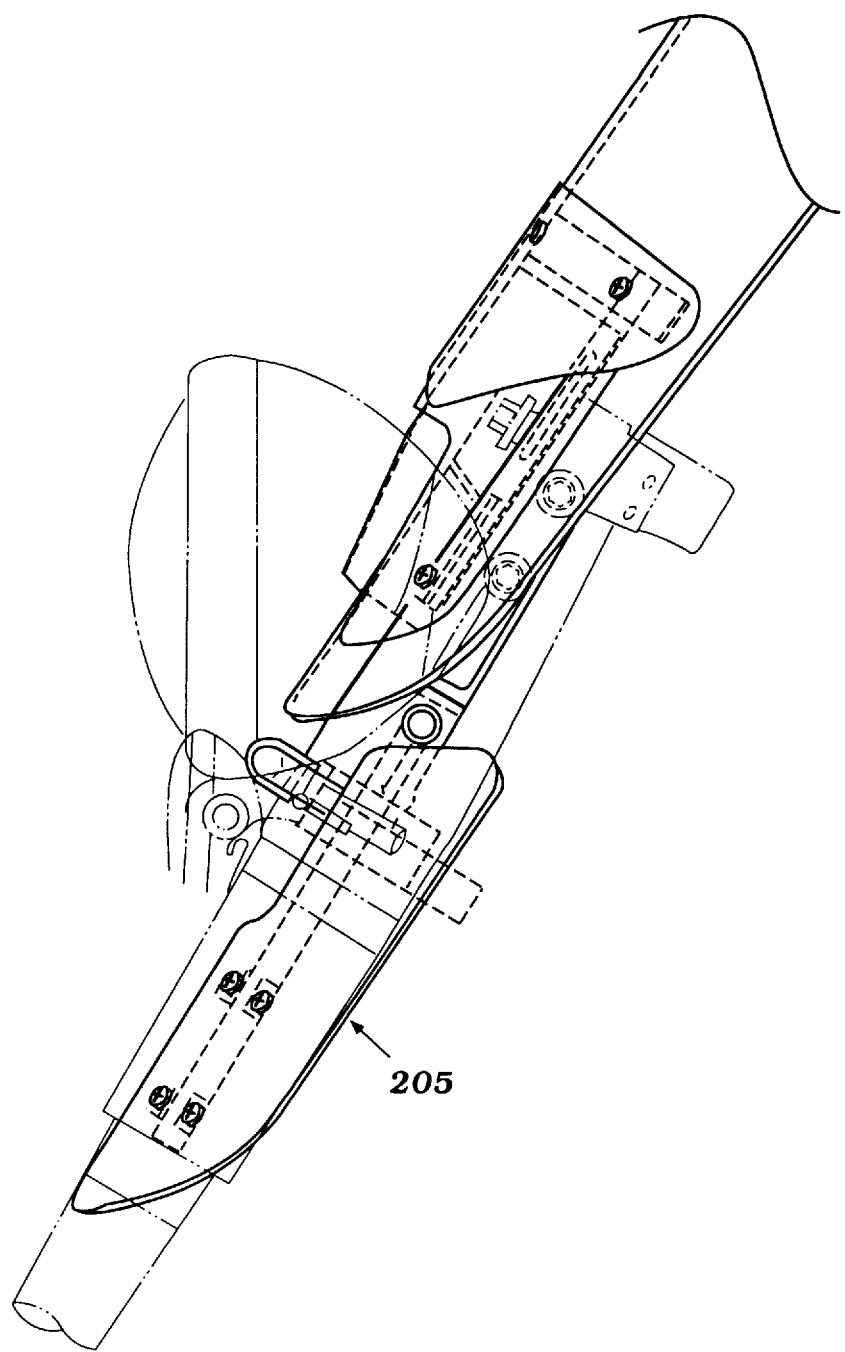
FIG. 26 is a side elevational view of the portion of the front wheel suspension assembly as shown in FIG. 25.

An air shield and leg protector 205 is affixed to this assembly at each side of the motorcycle, and his shield appears best in FIGS. 25 and 26. This shield is connected to a windshield mounting post assembly 206 by a lower arm 207 and fasteners 208. These shields 205 may be adjusted vertically relative to a windshield 209 that is mounted on the upper side of the bracket 206 by further connectors 211.

Figure 27:
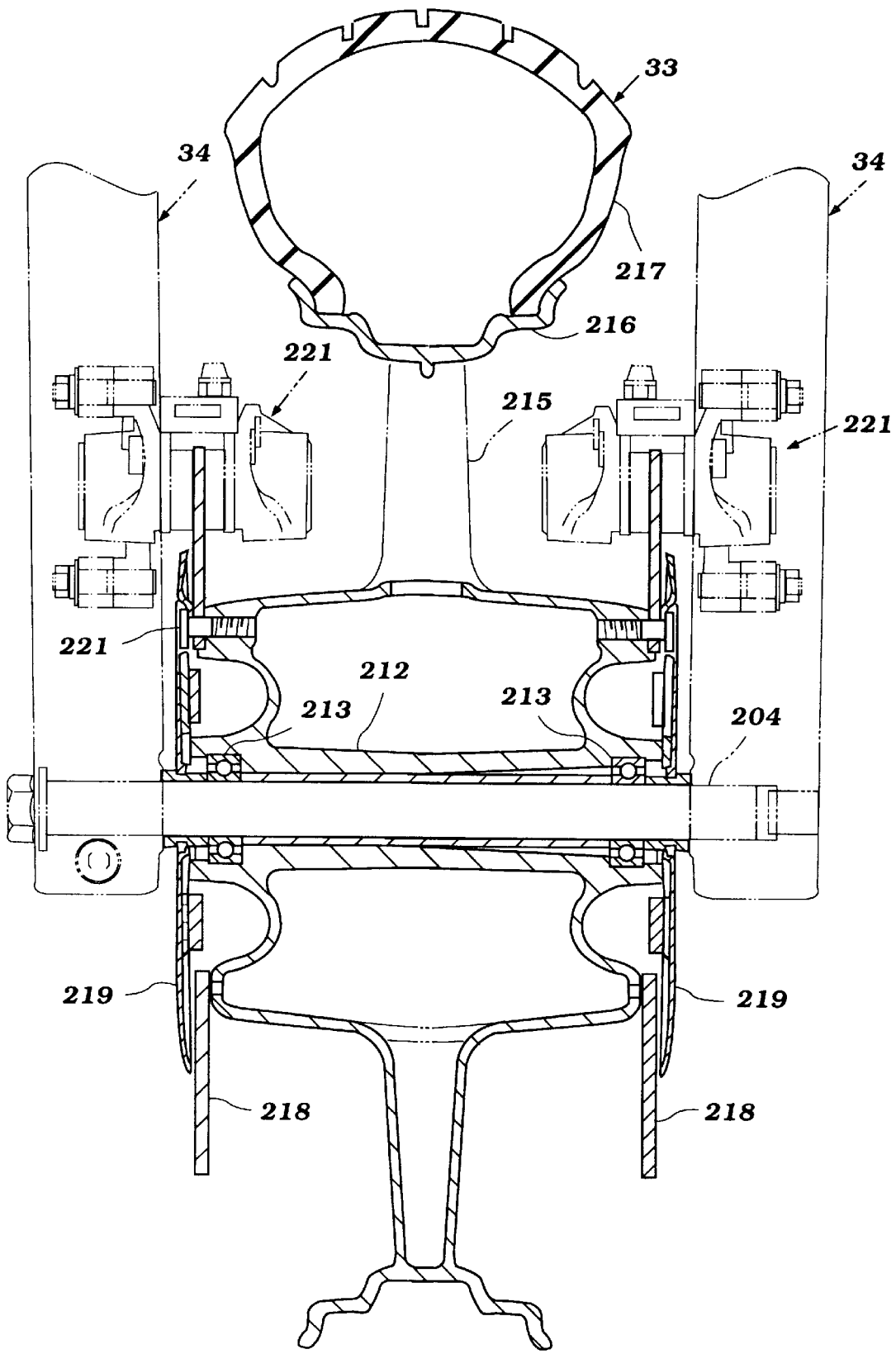
FIG. 27 is a cross-sectional view taken through the front wheel showing the front fork and brake assembly for the front wheel in phantom.
Figure 28:
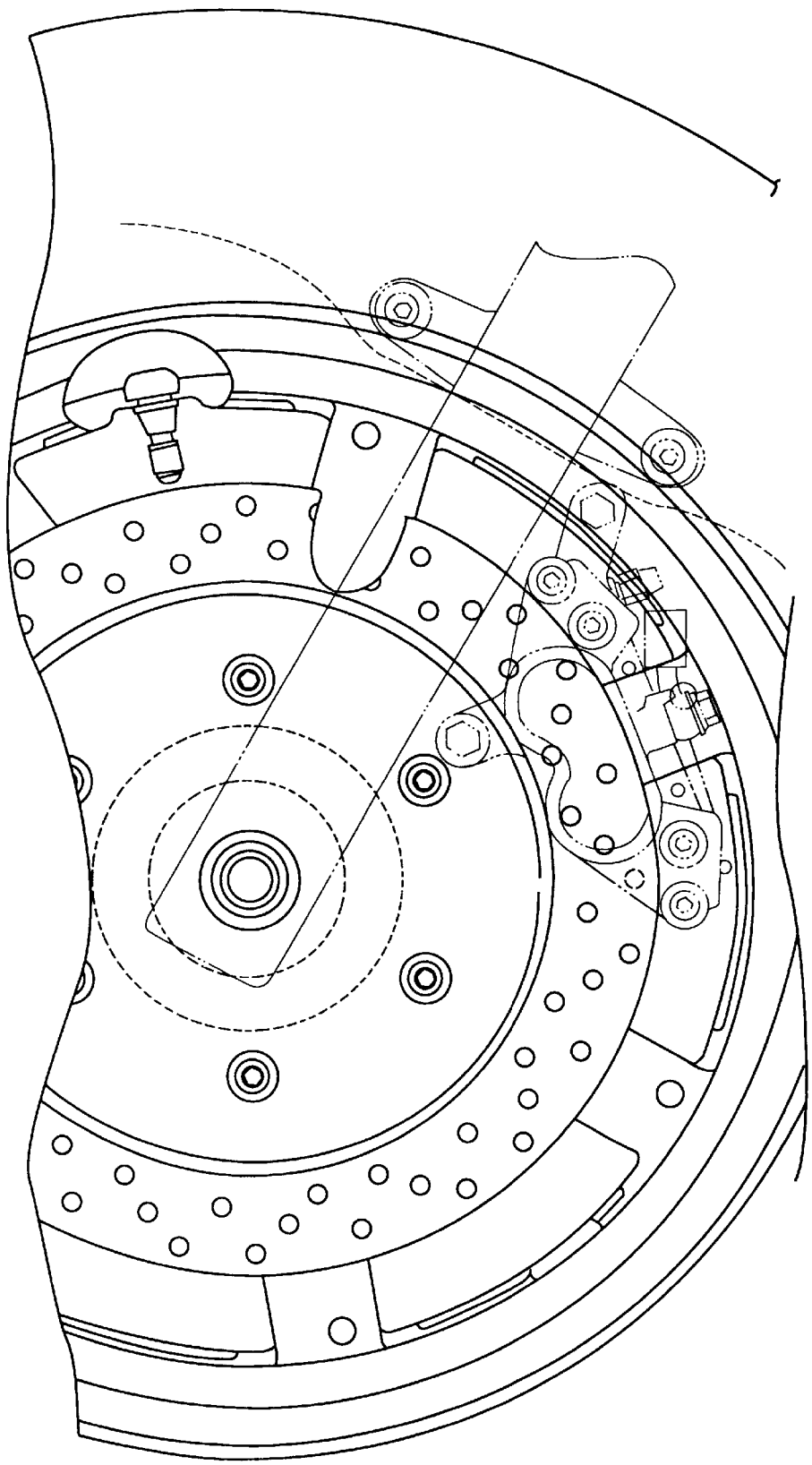
FIG. 28 is an enlarged partial side elevational view of the front wheel showing primarily the brake assembly, with the front fork being shown in phantom.

The journaling for the front wheel on the axle 204 will now be described by primary reference to FIGS. 27 and 28. The front wheel 33 is actually comprised of a wheel consisting of a hub 212 that is journaled by a pair of bearings 213 on the axle shaft 204. This front wheel has spokes 215 that support an outer rim 216 on which the tire 217 of the front wheel 33 is mounted.

Affixed for rotation with the front wheel is a pair of brake discs 218 of the ventilated type. A cover or dust plate 219 is carried by the front wheel by means of fasteners 211. A caliper assembly, indicated by the reference numeral 212, is mounted on each fork 34 in encompassing relationship with the outer periphery of the brake discs 218. Pairs of pistons are hydraulically actuated, and function to break the front wheel in a well-known manner.

Thus, from the foregoing description, it should be readily apparent that the suspension system for the rear wheel 37 is quite compact, and yet permits large degrees of suspension travel with good damping. The foregoing description is, however, that of a preferred embodiment of the invention, and various changes and modifications may be made without departing from the spirit and scope of the invention, as defined by the appended claims.

What is claimed is:

1. A rear suspension for a motorcycle having a frame assembly, a trailing arm having a forward pivotal connection to said frame assembly and carrying a rear wheel at a rearward portion thereof for suspension travel of said rear wheel relative to said frame assembly upon pivotal movement of said trailing arm, a telescopic suspension unit having a pair of relatively movable elements for cushioning of suspension travel of said rear wheel, a bellcrank having a first pivotal connection to one of said suspension unit elements, said bellcrank having a second pivotal connection to said trailing arm, spaced generally upwardly and rearwardly of said first pivotal connection, said bellcrank having a first arm portion extending between said first and said second pivotal connections said bellcrank having a third pivotal connection to said frame assembly formed forwardly and upwardly of said first pivotal connection for effecting movement of said one suspension element upon movement of said rear wheel relative to said frame assembly, said bellcrank having a second arm portion extending between said first and said third pivotal connections, said first pivotal connection lying below said second and said third pivotal connections, and means for providing a connection between the other of said suspension unit elements and said frame for loading said suspension unit.

2. A rear suspension as set forth in claim 1, wherein the telescopic suspension unit extends in a horizontal direction.

3. A rear suspension as set forth in claim 2, wherein the telescopic suspension unit is disposed in parallel relationship to a lower portion of the frame.

4. A rear suspension as set forth in claim 1, further including an engine mounted in the frame assembly for driving the rear wheel, said engine having a combined crankcase and change speed transmission assembly, said suspension unit being disposed, at least in part, beneath said crankcase change-speed transmission assembly.

5. A rear suspension for a motorcycle having a frame assembly, a trailing arm having a forward pivotal connection to said frame assembly and carrying a rear wheel at a rearward portion thereof for suspension travel of said rear wheel relative to said frame assembly upon pivotal movement of said trailing arm, a telescopic suspension unit having a pair of relatively movable elements for cushioning of suspension travel of said rear wheel, a bellcrank having a first pivotal connection to one of said suspension unit elements, said bellcrank having a second pivotal connection to said trailing arm, spaced generally upwardly and rearwardly of said first pivotal connection, said bellcrank having a third pivotal connection to said frame assembly formed forwardly and upwardly of said first pivotal connection for effecting movement of said one suspension element upon movement of said rear wheel relative to said frame assembly, and means for providing a connection between the other of said suspension unit elements and said frame for loading said suspension unit, said third pivotal connection between said bellcrank and said frame assembly being provided by a link pivotally connected at one end to said bellcrank at said third pivotal connection and at its other end to said frame assembly.

6. A rear suspension as set forth in claim 5, wherein the bellcrank comprises a closed triangularly shaped element.

7. A rear suspension as set forth in claim 6, wherein the telescopic suspension unit extends in a horizontal direction.

8. A rear suspension as set forth in claim 7, wherein the telescopic suspension unit is disposed in parallel relationship to a lower portion of the frame.

* * * * *